(12) United States Patent
Teyeb et al.

(10) Patent No.: US 12,238,560 B2
(45) Date of Patent: Feb. 25, 2025

(54) IDLE/INACTIVE MEASUREMENT HANDLING DURING RADIO RESOURCE CONTROL STATE TRANSITIONS

(71) Applicant: Telefonaktiebolaget LM Ericsson (PUBL), Stockholm (SE)

(72) Inventors: Oumer Teyeb, Montréal (CA); Icaro L. J. da Silva, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 545 days.

(21) Appl. No.: 17/595,219

(22) PCT Filed: May 12, 2020

(86) PCT No.: PCT/IB2020/054476
§ 371 (c)(1),
(2) Date: Nov. 11, 2021

(87) PCT Pub. No.: WO2020/230019
PCT Pub. Date: Nov. 19, 2020

(65) Prior Publication Data
US 2022/0217563 A1 Jul. 7, 2022

Related U.S. Application Data

(60) Provisional application No. 62/848,487, filed on May 15, 2019.

(51) Int. Cl.
*H04W 76/27* (2018.01)
*H04W 24/08* (2009.01)
*H04W 24/10* (2009.01)

(52) U.S. Cl.
CPC ........... *H04W 24/10* (2013.01); *H04W 24/08* (2013.01); *H04W 76/27* (2018.02)

(58) Field of Classification Search
CPC ...... H04W 24/10; H04W 76/27; H04W 24/08
See application file for complete search history.

(56) References Cited

U.S. PATENT DOCUMENTS 10,791,562 B2 * 9/2020 Ryoo .................. H04W 72/542
11,363,667 B2 * 6/2022 Wang ................... H04W 24/08
(Continued)

FOREIGN PATENT DOCUMENTS

| WO | WO-2011097766 A1 * | 8/2011 | ............. H04B 7/022 |
| WO | 2019 190383 A1 | 10/2019 | |
| WO | WO-2020047080 A1 * | 3/2020 | ............. H04L 27/26 |

OTHER PUBLICATIONS

3GPP TS 38.331 v15.3.0; Technical Specification; 3rd Generation Partnership Project; Technical Specification Group Radio Access Network; NR; Radio Resource Control (RRC) protocol specification (Release 15)—Sep. 2018.
(Continued)

*Primary Examiner* — Ajit Patel
(74) *Attorney, Agent, or Firm* — Sage Patent Group

(57) ABSTRACT

According to certain embodiments, a method performed by a wireless device (110) for measurement reporting includes transmitting, to a network node (160), a first message to initiate a transition from a dormant state to a connected state. The wireless device receives, from the network node, a second message including an indication of whether the wireless device is to release or keep at least one measurement configuration for performing measurements while in the dormant state. Based on the first message, the wireless device determines whether to release or keep the at least one measurement configuration for performing measurements while the wireless device is in the dormant state.

19 Claims, 14 Drawing Sheets

(56) References Cited

U.S. PATENT DOCUMENTS

| | | | | |
|---|---|---|---|---|
| 2014/0235271 | A1* | 8/2014 | Jung | H04W 24/10 |
| | | | | 455/456.1 |
| 2019/0037425 | A1* | 1/2019 | Hong | H04W 72/23 |
| 2020/0029239 | A1* | 1/2020 | Chen | H04W 76/19 |
| 2020/0128422 | A1* | 4/2020 | Kim | H04W 4/06 |
| 2020/0351689 | A1* | 11/2020 | Bao | H04W 36/0058 |
| 2021/0037594 | A1* | 2/2021 | Dalsgaard | H04W 76/34 |
| 2021/0105707 | A1* | 4/2021 | Virtej | H04W 76/15 |
| 2021/0185614 | A1* | 6/2021 | Zhou | H04L 5/0051 |
| 2021/0227417 | A1* | 7/2021 | Wang | H04W 36/0058 |
| 2021/0307107 | A1* | 9/2021 | Wang | H04W 76/27 |
| 2022/0046747 | A1* | 2/2022 | Da Silva | H04W 52/0229 |
| 2022/0182859 | A1* | 6/2022 | Da Silva | H04W 52/0219 |
| 2022/0272787 | A1* | 8/2022 | Wang | H04W 76/30 |

OTHER PUBLICATIONS

PCT Notification of Transmittal of the International Search Report and the Written Opinion of the International Searching Authority, or the Declaration issued for International application No. PCT/IB2020/054476—Jul. 15, 2020.

3GPP TSG-RAN2 Meeting #103bis; Chengdu, China; Change Request; Title: Secondary node resume in NE-DC and NR-DC; Source to WG: Ericsson; Source to TSG: n.a. (draft CR to be merged into rapporteur's CR when agreed) (R2-1814666)—Oct. 8-12, 2018.

3GPP TSG RAN WG2 #106; Reno, Nevada; Title: Handling of idle/inactive measurement configuration during 2-step Resume/Release (R2-1906014 (Resubmission of R2-1904552))1814666)—May 13-17, 2019.

3GPP TSG-RAN WG2 Meeting #108; Reno, USA; Title: Open issues for early measurement; Source: Oppo (R2-1914553)1814666)—Nov. 18-22, 2019.

3GPP TSG-RAN WG2 Meeting #108; Reno, USA; Source: Nokia, Nokia Shanghai Bell; Title: Early measurements with 2-step resume (R2-1915059)1814666)—Nov. 18-22, 2019.

* cited by examiner

IDLE/INACTIVE MEASUREMENT HANDLING DURING RADIO RESOURCE CONTROL STATE TRANSITIONS

PRIORITY

This nonprovisional application is a U.S. National Stage Filing under 35 U.S.C. § 371 of International Patent Application Serial No. PCT/IB2020/054476 filed May 12, 2020 and entitled "Idle/Inactive Measurement Handling During Radio Resource Control State Transitions" which claims priority to U.S. Provisional Patent Application No. 62/848,487 filed May 15, 2019 both of which are hereby incorporated by reference in their entirety.

TECHNICAL FIELD

The present disclosure relates, in general, to wireless communications and, more particularly, systems and methods for idle/inactive measurement handling during Radio Resource Control (RRC) state transitions.

BACKGROUND

In Rel-10, Carrier Aggregation (CA) was introduced in Long Term Evolution (LTE) to enable the UE to transmit/receive information via multiple cells (so called Secondary Cells (SCells)) from multiple carrier frequencies, to benefit of the existing of non-contiguous and contiguous carriers. In CA terminology, the Primary Cell (PCell) is the cell towards which the user equipment (UE) established the RRC connection or did handover to. In CA, cells are aggregated on Medium Access Control-level. Medium Access Control (MAC) gets grants for a certain cell and multiplexes data from different bearers to one Transport Block being sent on that cell. Also, MAC controls how that process is done. FIG. 1 illustrates multiple Packet Data Convergence Protocols (PDCPs) and Radio Link Controls (RLCs) connected to multiple cells (e.g., Cell1, Cell2, and Cell3) via a MAC layer.

SCells can be "added" (a.k.a. "configured") for the UE using RRC signaling (e.g. RRCConnectionReconfiguration), which takes in the order of 100s of milliseconds. A cell which is configured for the UE becomes a "serving cell" for this UE. An SCell may also be associated to an SCell state. When configured/Added via RRC, an SCell starts in deactivated state. In LTE Rel-15, eNB can indicate to activate-upon-configuration, or change the state, at least in RRCReconfiguration.

In LTE Rel-15, a new intermediate state between the deactivated and active state has been introduced for enhanced uplink operation. FIG. 2 illustrates the possible states for a cell as discussed in LTE Rel-15. Specifically, in LTE rel-15, a new intermediate state between the deactivated and active state has been introduced for enhanced uplink operation. This state is the dormant state and has not yet been introduced in New Radio (NR). The action of moving into a dormant state is called hibernation.

A MAC Control Element (MAC CE) can be used to change the SCell state between the three states as shown below. There are also timers in MAC to move a cell between deactivated/activated/dormant. These timers are:

sCellHibernationTimer; which moves the SCell from activated state to dormant state,
sCellDeactivationTimer; which moves the SCell from activated state to deactivated state
dormantSCellDeactivationTimer; which moves the SCell from dormant state to deactivated state The MAC level SCell activation takes in the order of 20-30 ms.

Once the network understands the need to configure and/or activate CA, the question is which cells to initially configure and/or activate, if they are configured, and/or whether a cell/carrier is good enough in terms of radio quality/coverage (e.g. Reference Signal Received Power (RSRP) and Reference Signal Received Quality (RSRQ)). To understand the conditions on SCell(s) or potential SCell (s) in a given available carrier, the network may configure the UE to perform RRM measurements.

Typically, the network may be assisted by RRM measurements to be reported by a UE. Network may configure the UE with measurement IDs associated to reportConfig with event A1 (Serving becomes better than threshold) in case this is a configured SCell, or A4 (Neighbour becomes better than threshold) for carriers without a configured SCell. The measurement objects are associated to the carrier the network wants reports on. If network is aware of the exact cells it wants the UE to measure, a so-called white cell list can be configured in the measurement object so that the UE is only required to measure these cells in that carrier.

FIG. 3 illustrates a signaling flow diagram for reconfiguration of a UE in RRC_Connected after the Master Node (MN) makes the decision to set up CA and/or Dual Connectivity (DC). Specifically, the MN sends a RRCReconfiguation message, which is a measConfig with for example, A4. After a period of time equal to the time it takes to get the first measurement reports, the UE sends a RRCMeasurementReport for carriers and cells. The MN then makes a decision for SCell addition or SCell activation based on the RRCMeasurementReport and transmits a RRCReconfiguration message to the UE.

With the later introduction of Dual Connectivity in Rel-12, it was possible to add what is called SCG (Secondary Cell Group) configuration to the UE. The main benefit would be that the UE could in principle add a cell from another eNodeB. Protocol wise, that would require different MAC entities, one for each cell group. The UE will have two cell groups, one associated to the PCell (master node) and another associated to a PScell (of the secondary eNodeB), where each group may possibly have their own associated SCells.

When it comes to adding SCells, when the UE is in single connectivity, just to exemplify, the RRCConnectionReconfiguration message may carry a cell index (so MAC identifiers are optimized, i.e., shorter), cell identifier and carrier frequency, common parameters, and, state information, later introduced in Rel-15 (activated or dormant). The procedure to add SCells to the MCG in LTE (or to modify) is described in Sections 5.3.5.3 and 5.3.10.3b of 3GPP TS 36.331.

5G in 3GPP introduce both a new core network (5GC) and a New Radio Access Network (NR). The core network (CN), 5GC, will however, also support other RATs than NR. It has been agreed that LTE (or E-UTRA) should also be connected to 5GC. LTE base stations (eNBs) that are connected to 5GC is called ng-eNB and is part of NG-RAN which also consist of NR base stations called gNBs. FIG. 4 illustrates the 5GS architecture including 5GC and NG-RAN. More specifically, FIG. 4 shows how the base stations are connected to each other and the nodes in 5GC.

There are different ways to deploy 5G network with or without interworking with LTE (also referred to as E-UTRA) and evolved packet core (EPC). FIG. 5 illustrates LTE and NR Interworking Options.

In principle, NR and LTE can be deployed without any interworking, denoted by NR stand-alone (SA) operation, that is gNB in NR can be connected to 5G core network (5GC) and eNB can be connected to EPC with no interconnection between the two (Option 1 and Option 2 in FIG. 5). On the other hand, the first supported version of NR is the so-called E-UTRAN-NR Dual Connectivity (EN-DC), illustrated by Option 3. In such a deployment, dual connectivity between NR and LTE is applied with LTE as the master and NR as the secondary node. The RAN node (gNB) supporting NR, may not have a control plane connection to core network (EPC), instead it relies on the LTE as master node (MeNB). This is also called as "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, option 2 supports stand-alone NR deployment where gNB is connected to 5GC. Similarly, LTE can also be connected to 5GC using option 5 (also known as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that, Option 4 and option 7 are other variants of dual connectivity between LTE and NR which will be standardized as part of NG-RAN connected to 5GC, denoted by MR-DC (Multi-Radio Dual Connectivity). Under the MR-DC umbrella, there is the following:

EN-DC (Option 3): LTE is the master node and NR is the secondary (EPC Core Network (CN) employed)
    NR E-UTRAN-NR Dual Connectivity (NR NE-DC) (Option 4): NR is the master node and LTE is the secondary (SGCN employed)
    NG-RAN E-UTRAN-NR Dual Connectivity (NGEN-DC) (Option 7): LTE is the master node and NR is the secondary (SGCN employed)
    NR Dual Connectivity (NR-DC) (variant of Option 2): Dual connectivity where both the master and secondary are NR (SGCN employed).

As migration for these options may differ from different operators, it is possible to have deployments with multiple options in parallel in the same network e.g. there could be eNB base station supporting option 3, 5 and 7 in the same network as NR base station supporting 2 and 4. In combination with dual connectivity solutions between LTE and NR, it is also possible to support CA in each cell group (i.e. MCG and SCG) and dual connectivity between nodes on same RAT (e.g. NR-NR DC). For the LTE cells, a consequence of these different deployments is the co-existence of LTE cells associated to eNBs connected to EPC, 5GC or both EPC/5GC.

There are different possibilities for the NR and LTE resume procedures. For example, in a successful RRC connection establishment procedure for NR, a UE may send a RRCSetupRequest to the network, receive a RRCSetup message from the Network, and then send a RRCSetupComplete message to the network. Conversely, where the RRC connection establishment procedure for NR is unsuccessful, the UE may send a RRCSetupRequest to the network and receive a RRCReject message from the network.

As another example, in a successful RRC connection establishment procedure for LTE, the UE may send a RRC-ConnectionRequest to the EUTRAN, receive a RRCConnectionSetup message from the ETURAN, and send a RRC-ConnectionSetupComplete message to the EUTRAN. Conversely, where the RRC connection establishment procedure for LTE is unsuccessful, the UE may send a RRC-ConnectionRequest to the EUTRAN and receive a RRCConnectionReject from the EUTRAN.

The purpose of these procedures is to establish an RRC connection. RRC connection establishment involves Signaling Radio Bearer-1 (SRB1) establishment. The procedure is also used to transfer the initial Non-Access Stratum (NAS) dedicated information/message from the UE to the network.

The network applies the procedure as follows:
    When establishing an RRC connection;
    When UE is resuming or re-establishing an RRC connection, and the network is not able to retrieve or verify the UE context. In this case, UE receives RRCSetup/RRCConnetionSetup and responds with RRCSetupComplete/RRCConnectionSetupComplete.

The UE starts the timer T300 upon the sending of the establishment request (i.e RRCConnectionSetupRequest in LTE or RRCSetupRequest in NR) and, if this timer expires before the reception of the RRCConnctionSetup/RRCSetup message from the network, the UE will stop the connection establishment procedure and remain in IDLE mode.

The UE may also receive an RRCConnectionReject (in LTE) or RRCReject (in NR) in response to the RRCConnctionSetupRequest (LTE) or RRCSetupRequest (NR) message. This will also make the UE remain in the IDLE state. If a wait timer is included, the UE will start a timer (T302) and when this timer expires, it informs higher layers, which may trigger the establishment procedure again.

A very typical scenario/use case is a UE with some burst traffic that comes and goes e.g. some video packets, idle periods of transmission/reception, then comes live again. To save UE power, the network transitions the UE from connected to idle during these periods. Then, UE comes back again (either via paging or UE request to get connected) and accesses the network.

In LTE Rel-13, a mechanism was introduced for the UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of as prior to establish the RRC connection from scratch. Reducing the signaling could have several benefits:

Reduce latency e.g. for smart phones accessing Internet
    Reduced signaling leads to reduce battery consumption for machine type devices sending very little data.

The Rel-13 solution is based on that the UE sends a RRCConnectionResumeRequest message to the network and in response may receive an RRCConnectionResume from the network. The RRCConnectionResume is not encrypted but integrity protected.

The resume procedure in LTE can be found in the RRC specifications (3GPP TS 36.331). As the UE performing resume is in RRC_IDLE (with suspended AS context), that triggers a transition from RRC_IDLE to RRC_CONNECTED. Hence, that is modelled in the specifications in the same subclause that captures the RRC connection establishment (subclause 5.3.3 RRC connection establishment).

There are different possibilities for resume procedures for NR and LTE. For example, in a successful RRC connection resume procedure for NR, the UE may send a RRCResumeRequest/RRCResumeRequest1 message to the network, receive a RRCResume message from the network, and send a RRCResumeComplete message to the network.

As another example, in a successful RRC connection resume fallback procedure for NR, the UE may send a RRCResumeRequest/RRCResumeRequest1 to the network, receive a RRCSetup message from the network, and send a RRCSetupComplete message to the network.

As another example, in a successful RRC connection resume followed by network release for NR, the UE may send a RRCResumeRequest/RRCResumeRequest1 message to the network and receive a RRCRelease message from the network.

As still another example, in a successful RRC connection resume procedure followed by a network suspend for NR, the UE may send a RRCResumeRequest/RRCResumeRequest1 message to the network and receive a RRCRelease with suspend configuration message from the network.

As another example, in an unsuccessful RRC connection resume procedure for NR, the UE may send a RRCResumeRequest/RRCResumeRequest1 message to the network and receive a RRCReject message from the network.

As another example, in a successful RRC connection resume (suspended RRC connection or RRC_INACTIVE) procedure for LTE, the UE may send a RRCConnectionResumeRequest message to the EUTRAN, receive a RRCConnectionResume message from the UETRAN, and send a RRCConnectionResumeComplete message from the EUTRAN.

As another example, in a successful RRC connection resume (suspended RRC connection or RRC_INACTIVE) procedure for LTE, the UE may send a RRCConnectionResumeRequest message to the EUTRAN, receive a RRCConnectionSetup message from the EU IRAN, and send a RRCConnectionSetupComplete message to the EUTRAN.

As yet another example, in an unsuccessful RRC connection resume procedure after a network reject (suspend RRC connection or RRC_INACTIVE) for LTE, the UE may send a RRCConnectionRequest message to the EUTRAN and receive a RRCConnectionReject message from the EUTRAN.

As still another example, in a successful RRC connection resume procedure (RRC_INACTIVE) with a network release for LTE, the UE may send a RRCConnectionResumeRequest to the EU IRAN and receive a RRCConnectionRelease message from the EUTRAN.

There are few things relevant to highlight in the SCG configurations and SCell configurations for MCGs in relation to suspend/resume procedures. Upon suspension, it is defined that the UE stores its used RRC configuration. In other words, if the UE is operating in any dual connectivity mode (and has a n SCG configuration) or just having configured SCells in the MCG, it shall store all these configurations. However, upon resume, at least until Rel-15, it is defined in Section 5.3.2 of 3GPP TS 36.331 that the UE shall release the SCG configurations and SCell configurations.

Thus, when the UE comes from RRC_IDLE with the context, if network wants to add SCell(s) to the MCG or add an SCG, it needs to do that from scratch, even if the UE is suspending and resuming in the same cell/area where all the previous PCell and SCell configurations are still valid from a radio conditions perspective.

As the use case of UEs with burst traffic constantly being suspended and resuming in the same cell is quite typical, 3GPP has standardized a solution in LTE to enable the UE to assist the network with measurements performed while the UE is in RRC_IDLE so that the network could speed up the setup of carrier aggregation or dual connectivity. The existing solution for early measurements upon idle to connected transition in LTE (Rel-15) will now be described.

In LTE Rel-15, it is possible to configure the UE to report so called early measurements upon the transition from idle to connected state. These measurements are measurements that the UE can perform in idle state, and according to a configuration provided by the source cell with the intention to receive these measurements immediately after the UE gest connected and quickly setup CA and/or other forms of DC (e.g. EN-DC, MR-DC, etc.) without the need to first provide a measurement configuration (measConfig) in RRC_ CONNECTED, as discussed above, and wait for hundreds of milliseconds until first samples are collected, monitored and then the first reports are triggered and transmitted to the network.

A first aspect of the existing solution, as standardized in EUTRA 36.331, is described in 5.6.20 Idle Mode Measurements. The UE can receive these idle mode measurement configurations in the system information, such as a in a system information block-5 (SIBS) in the field MeasIdleConfigSIB-r15, indicating up to 8 cells or ranges of cell IDs to perform measurements on. In addition, the UE can be either configured upon the transition from RRC_CONNECTED to RRC_IDLE with a dedicated measurement configuration in the RRCConnectionRelease message with the measIdleDedicated-r15 which overrides the broadcasted configurations in SIBS.

The UE is provided with a list of carriers and optionally with a list of cells that the UE shall perform measurements. The fields s-NonIntraSearch in SystemInformationBlockType3 do not affect the UE measurement procedures in IDLE mode.

Upon the reception of that measurement configuration, the UE starts a timer T331 with the value provided in measIdleDuration, which can go from 0 to 300 seconds. The timer stops upon receiving RRCConnectionSetup, RRCConnectionResume, which indicates a transition to RRC_CONNECTED. That concept exists to limit the amount of time the UE perform measurements for that purpose of early measurements.

Another concept introduced in the LTE rel-15 solution is a validity area, which comprises a list of PCIs. The intention is to limit the area where CA or DC may be setup later when the UE resumes/setups the connection, so the early measurements are somewhat useful for that purpose. If validityArea is configured and UE reselects to a serving cell whose PCI does not match any entry in validityArea for the corresponding carrier frequency, the timer T331 is stopped. Then, UE stops to perform IDLE measurements and releases the configuration (i.e. VarMeasIdleConfig). Notice that this does not necessarily implies that the UE releases the idle measurements that were configured in Release and that were performed. For example, these may still be stored and possibly requested by the network. In addition, the UE may continue with IDLE mode measurements according to the broadcasted SIBS configuration after the timer T331 has expired or stopped.

Only measurements above a certain threshold shall be stored as the cell candidates for CA setup needs to be within a minimum acceptable threshold. How the UE performs measurements in IDLE mode is up to UE implementation as long as RAN4 requirements for measurement reporting defined in 3GPP TS 36.133 are met. The UE behaviour is captured in 36.331.

Note that it is not mandatory for the source node releasing/suspending the UE to provide a dedicated idle measurement configuration for the purpose of early measurements.

If the UE is released/suspended to idle without being provided with a list of carriers to be measured, the UE obtains that from SIB2.

And, in that case of the list not being provided in RRCConnectionRelease, at every cell reselection the UE performs the SIBS acquisition to possibly update its list of carriers to measure according to 5.2.2.12 of 3GPP TS 36.331.

If the UE enters a cell within the validity area that is not broadcasting the measurement configuration in SIBS, the UE continues to perform idle measurements according to the SIUB5 acquired in the source cell (i.e. the cell the UE was suspended or released).

As part of the standardized work on 5G NR in 3GPP, it has been decided that NR should support an RRC_INACTIVE state with similar properties as the suspended state in LTE Rel-13. The RRC_INACTIVE has slightly different properties from the late state in that it is a separate RRC state and not part of RRC_IDLE as in LTE. Additionally the CN/RAN connection (NG or N2 interface) is kept for RRC_INACTIVE while it was suspended in LTE. FIG. 6 illustrates possible state transitions in NR.

The properties of the states is as follows:
RRC_IDLE:
  A UE specific DRX may be configured by upper layers;
  UE controlled mobility based on network configuration;
  The UE:
    Monitors a Paging channel for CN paging using 5G-S-TMSI;
    Performs neighbouring cell measurements and cell (re-)selection;
    Acquires system information.
RRC_INACTIVE:
  A UE specific DRX may be configured by upper layers or by RRC layer;
  UE controlled mobility based on network configuration;
  The UE stores the AS context;
  The UE:
    Monitors a Paging channel for CN paging using 5G-S-TMSI and RAN paging using I-RNTI;
    Performs neighbouring cell measurements and cell (re-)selection;
    Performs RAN-based notification area updates periodically and when moving outside the RAN-based notification area;
    Acquires system information.
RRC_CONNECTED:
  The UE stores the AS context.
  Transfer of unicast data to/from UE.
  At lower layers, the UE may be configured with a UE specific DRX.;
  For UEs supporting CA, use of one or more SCells, aggregated with the SpCell, for increased bandwidth;
  For UEs supporting DC, use of one SCG, aggregated with the MCG, for increased bandwidth;
  Network controlled mobility, i.e. handover within NR and to/from E-UTRAN.
  The UE:
  Monitors a Paging channel;
  Monitors control channels associated with the shared data channel to determine if data is scheduled for it;
  Provides channel quality and feedback information;
  Performs neighbouring cell measurements and measurement reporting;
  Acquires system information.

Release 16 introduces early measurements upon idle/inactive to connected transition in NR. A work item has been approved in Rel-16 to enhance the setup of CA/DC in NR. The WID "Enhancing CA Utilization" was approved in RAN #80 in RP-181469, and updated in RAN #81 in RP-182076 and, one of the objectives is Early Measurement reporting, which includes the early and fast reporting of measurements information availability from neighbor and serving cells to reduce delay setting up MR-DC and/or CA [RAN2, RAN4] as follows:
  This objective applies to MR-DC, NR-NR DC and CA
  The objective should consider measurements in IDLE, INACTIVE mode and CONNECTED mode
  The impacts on UE power consumption should be minimized
  The LTE Rel-15 euCA work should be utilized, when applicable Hence, 3GPP is going to investigate solutions to enable early measurements performed when the UE is in RRC_INACTIVE or RRC_IDLE state and, reporting mechanisms for when the UE enters RRC_CONNECTED.

Three different kinds of solutions are being considered:
  1. UE reports early measurements in UEInformationResponse after request from network in UEInformationRequest transmitted after the UE sends an RRCResumeComplete or, after security is activated when UE comes from idle without stored context (as in LTE Rel-15);
  2. UE reports early measurements with (e.g. multiplexed with or as part of the message) RRCResumeComplete;
  3. UE reports early measurements with (e.g. multiplexed with or as part of the message) RRCResumeRequest;

There are some differences in details of each of these solutions, and not all of them may be applicable for RRC_IDLE in the same way they are for RRC_INATIVE. However, in any of these solutions for the reporting, the UE relies on a measurement configuration, which may be provided with dedicated signaling when the UE is suspended to RRC_INACTIVE or when the UE is released to RRC_IDLE. That measurement configuration indicates how the UE shall perform these measurements to be reported when the UE resumes (in the case of coming from RRC_INACTIVE or setups up a connection, in the case of coming from RRC_IDLE).

In RAN2 #105bis in Xi'an, agreements have been reached concerning early measurement reporting for fast EN-DC and CA in NR (and LTE for EN-DC).

R2-1903237 includes a summary of email discussion relating to NR/eCA-DC measurement configuration.

Certain problems exist. For example, with the introduction of early inactive measurements (which is already available in LTE rel-15, being enhanced in LTE Rel-16 and being standardized in NR Rel-16), as illustrated in FIG. 7, a UE may be configured to transition to a dormant state (LTE/NR IDLE, LTE IDLE with suspended, LTE/NR INACTIVE) from CONNECTED state and store a measurement configuration (either received in RRC Release like message with suspend configuration, or via system information). Then, upon entering the dormant state the UE starts to perform measurements according to that measurement configuration. As discussed above, when the connection is resumed (if transitioning from LTE IDLE with suspended or LTE/NR INACTIVE) or established (if transitioning from LTE/NR IDLE) later, the UE will report the early measurements (either during the initiation of the resume/establishment procedure, during the completion of the resume/establishment procedure, or after the resume/establishment has been completed).

In the existing solution standardized in LTE Rel-15 and shown in FIG. 7, upon entering Connected mode (i.e. upon the reception of an RRCConnectionResume or an RRCConnectionSetup), the UE deletes the measurement configuration for early measurements (IdleMeasConfig). This is done by stopping the timer T331 and defining that configurations are deleted upon stopping the timer T331 as discussed in 3GPP TS 36.331.

A similar handling will occur in NR for the AS Inactive Context, where upon entering RRC Connected the UE deletes the UE AS Inactive context, except the RNA configuration.

As in most of the cases, the UE is suspended and resume in the same cell, or at least in the same area (which may comprise a set of cells e.g. in the same gNodeB, gNodeB-CU and/or gNodeB-DU), early measurement configurations are provided in suspend/release and, once UE enters CONNECTED the UE deletes and, later on, when it is suspended again the exact same configuration (or at least most of it) would be provided to the UE, which is a waste of resource over the air interface at every transition from CONNECTED to INACTIVE. This is particularly inefficient considering the fact that in Release 16 it has been agreed for the idle mode configuration to include inter-RAT measurements (i.e. NR measurement configuration while the UE is in LTE IDLE, IDLE with suspended or INACTIVE mode, or LTE measurement configurations while the UE is in NR IDLE or INACTIVE). NR measurement configurations can be more complex/heavy as more detailed information such as SMTC configuration, beam measurement configurations, etc. can be provided.

SUMMARY

Certain aspects of the present disclosure and their embodiments may provide solutions to these or other challenges. For example, according to certain embodiments, wireless device and network methods are proposed to handle early measurements during suspend/resume and release/setup procedures. Various options are proposed for handling the previous measurement configurations and results.

According to certain embodiments, a method performed by a wireless device for measurement reporting includes transmitting, to a network node, a first message to initiate a transition from a dormant state to a connected state. The wireless device receives, from the network node, a second message including an indication of whether the wireless device is to release or keep at least one measurement configuration for performing measurements while in the dormant state. Based on the first message, the wireless device determines whether to release or keep the at least one measurement configuration for performing measurements while the wireless device is in the dormant state.

According to certain embodiments, a wireless device includes processing circuitry configured to transmit, to a network node, a first message to initiate a transition from a dormant state to a connected state. The processing circuitry receives, from the network node, a second message including an indication of whether the wireless device is to release or keep at least one measurement configuration for performing measurements while in the dormant state. Based on the first message, the processing circuitry determines whether to release or keep the at least one measurement configuration for performing measurements while the wireless device is in the dormant state.

According to certain embodiments, a method by a network node includes receiving, from a wireless device, a first message to initiate a transition from a dormant state to a connected state. The network node transmits, to the wireless device, a second message comprising information associated with at least one measurement configuration for performing measurements by the wireless device while the wireless device is in the dormant state. The information includes an indication for determining by the wireless device whether to keep or release the at least one measurement configuration.

According to certain embodiments, a network node includes processing circuitry configured to receive, from a wireless device, a first message to initiate a transition from a dormant state to a connected state. The processing circuitry transmits, to the wireless device, a second message comprising information associated with at least one measurement configuration for performing measurements by the wireless device while the wireless device is in the dormant state. The information includes an indication for determining by the wireless device whether to keep or release the at least one measurement configuration.

Certain embodiments may provide one or more of the following technical advantages. For example, one technical advantage may be that according to certain embodiments the network does not need to provide the same configuration multiple times when the UE enters RRC_INACTIVE or RRC_IDLE. This may be beneficial in reducing the amount of information transmitted in an RRCRelease/RRCReject like messages, which can lead to considerable load where there are a lot of UEs switching back and forth between connected and dormant state. As another example, a technical advantage may be that certain embodiments speed up the transfer of the RRC messages and reduce the chances of state mismatches between the UE and the network as there is no confirm/complete message from the UE to the network for RRCRelease/RRCReject messages.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
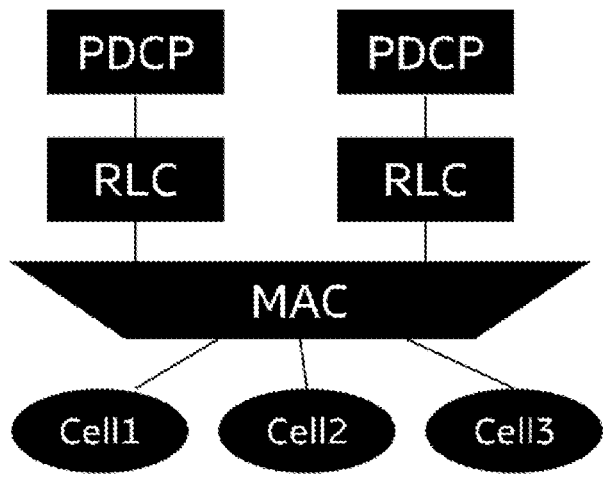
FIG. 1 illustrates multiple PDCPs and RLCs connected to multiple cells via a MAC layer.
Figure 2:
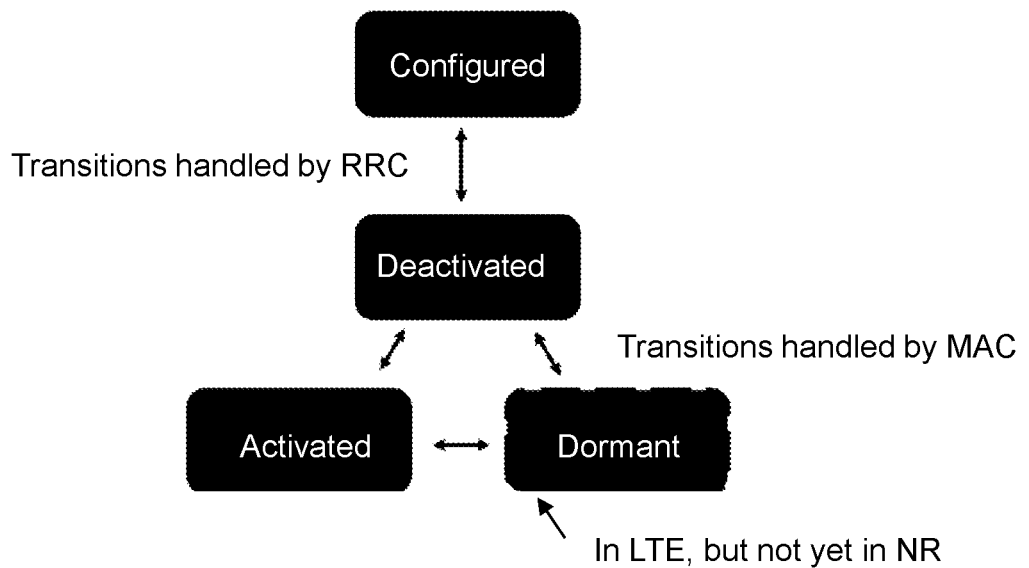
FIG. 2 illustrates the possible states for a cell as discussed in LTE Rel-15.
Figure 3:
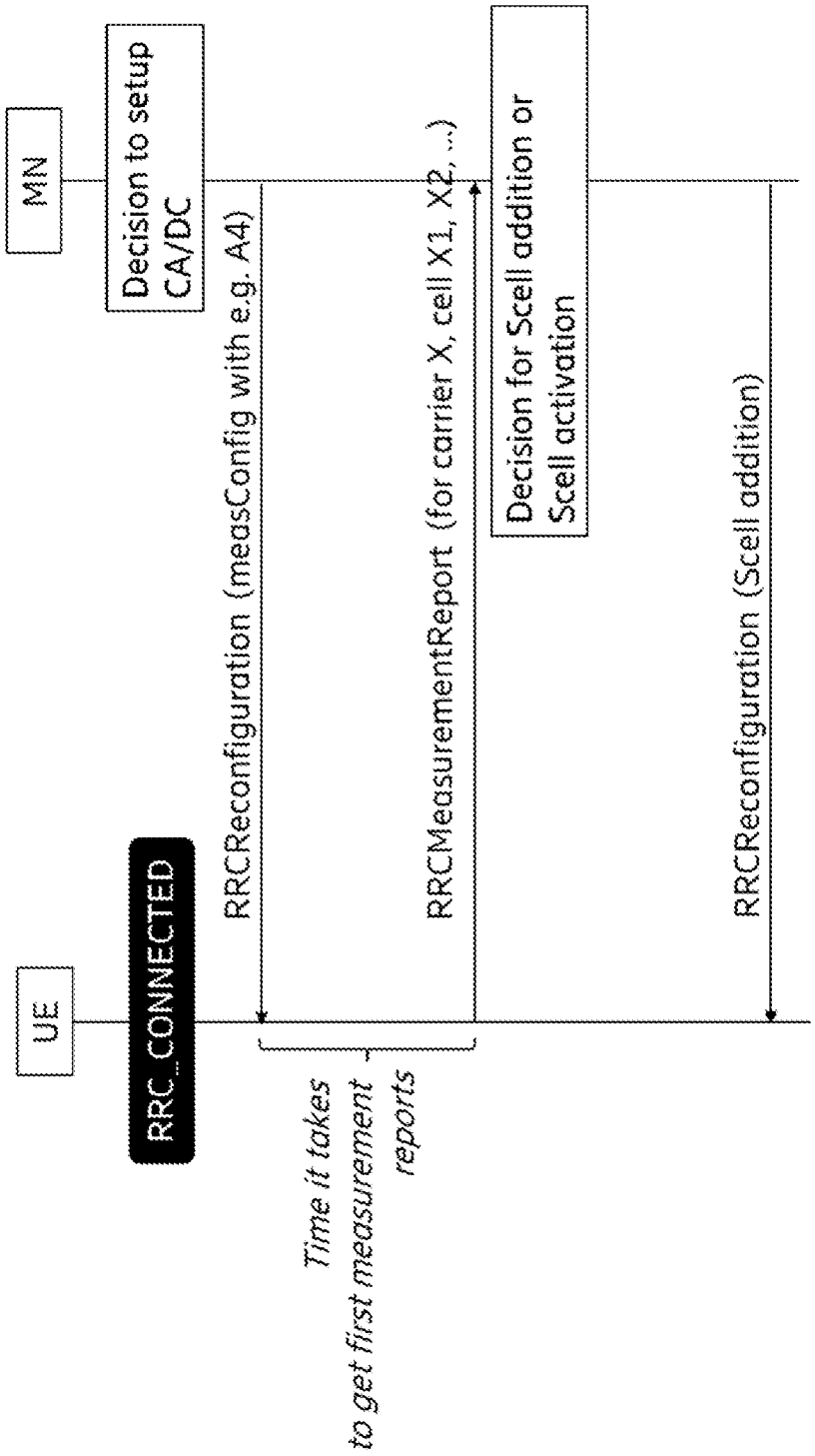
FIG. 3 a signaling flow diagram for reconfiguration of a UE in RRC_Connected after the MN makes the decision to set up CA and/or DC.
Figure 4:
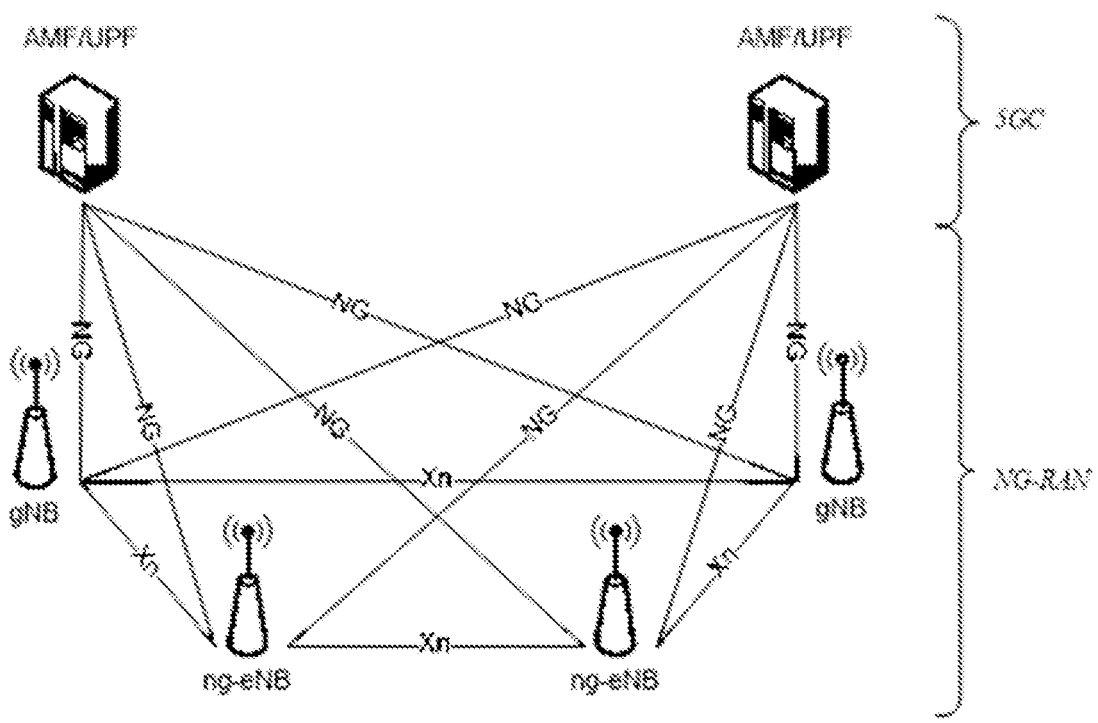
FIG. 4 illustrates the 5GS architecture including 5GC and NG-RAN.
Figure 5:
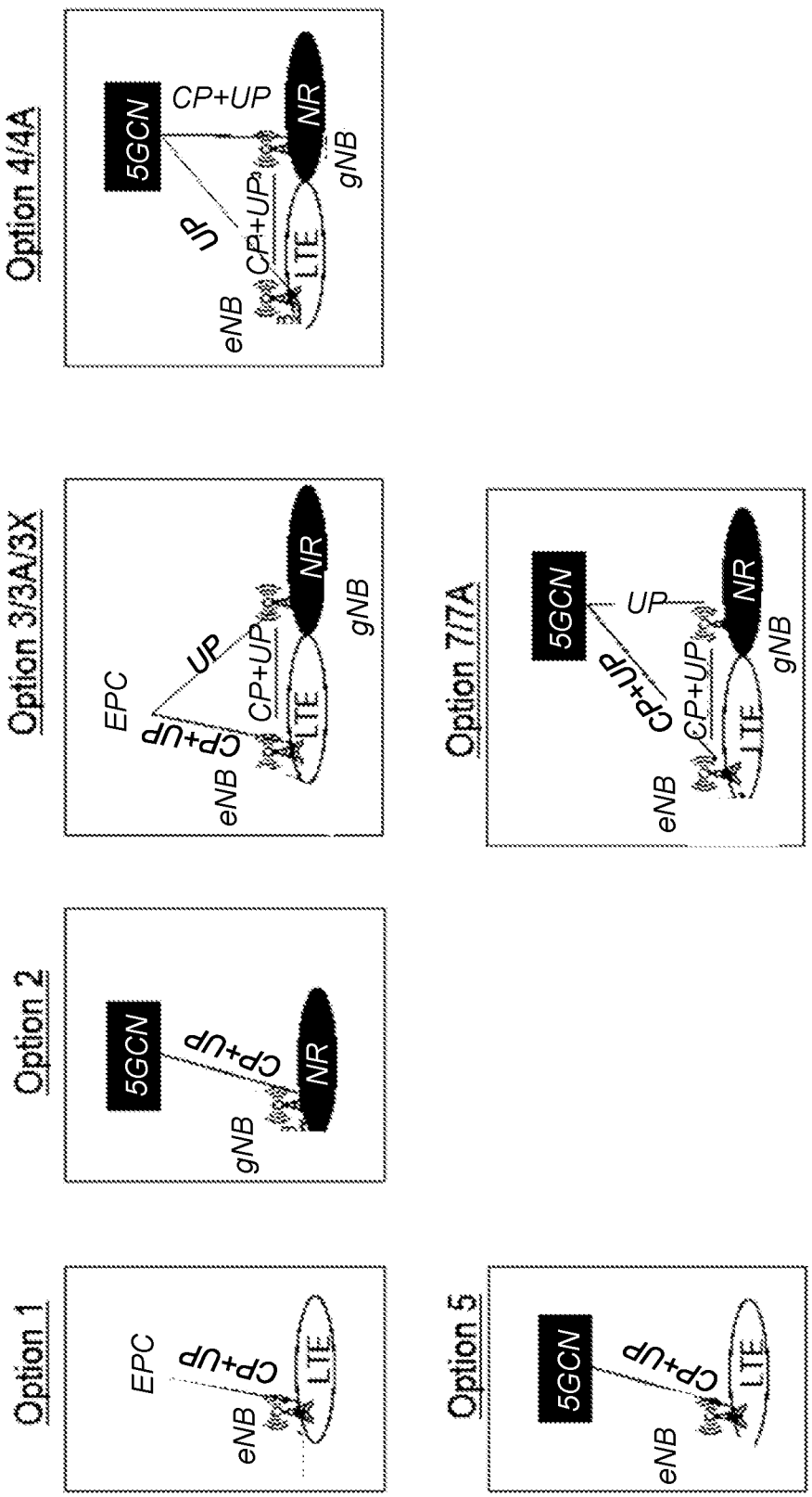
FIG. 5 illustrates LTE and NR Interworking Options.
Figure 6:
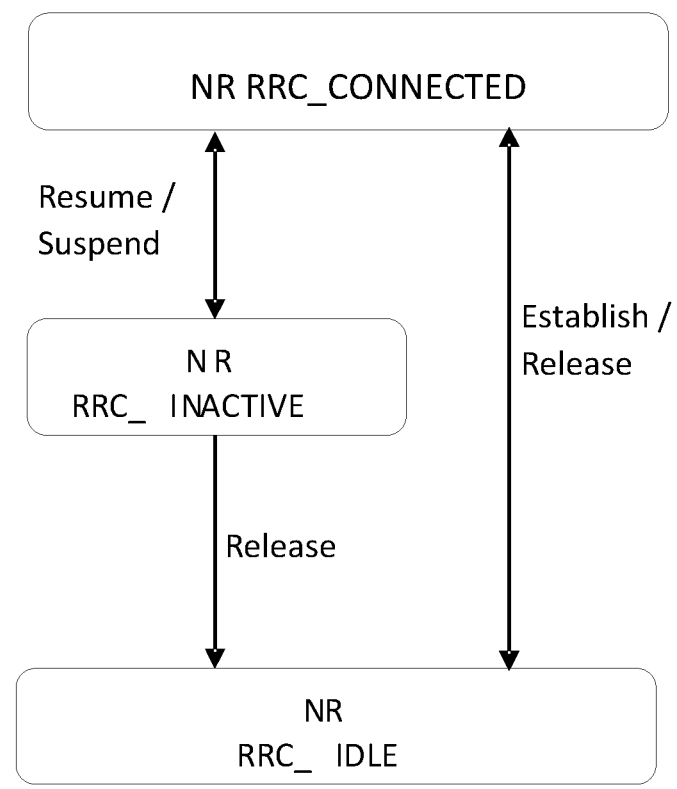
FIG. 6 illustrates possible state transitions in NR.
Figure 7:
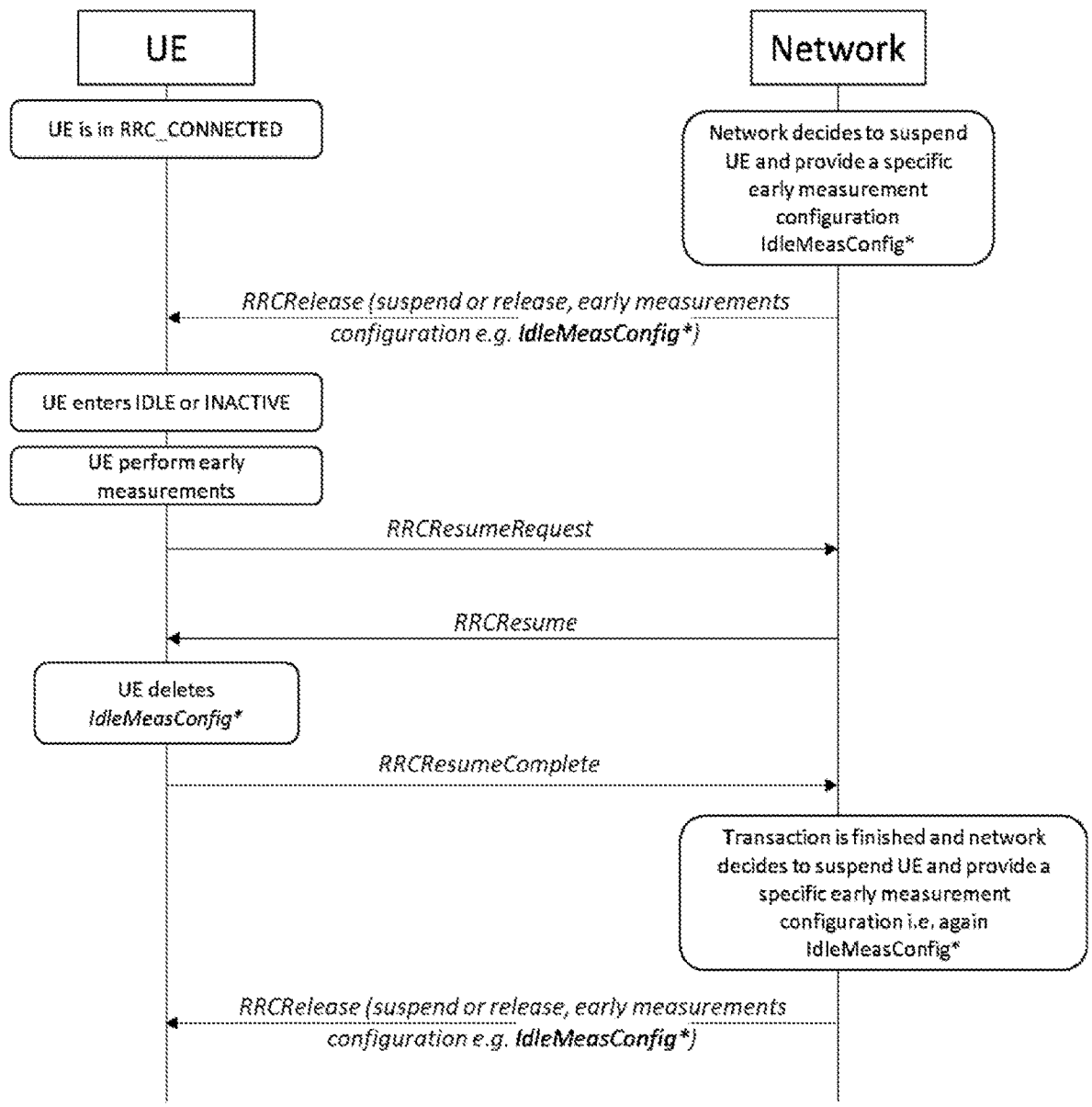
FIG. 7 illustrates an existing solution for early inactive measurements.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel And in the following the transmitter or receiver could be either gNB, or UE.

The descriptions below are mostly targeting NR for the sake of brevity. However, the methods are equally applicable to LTE (RRCConnectionResume substituted for RRCResume, RRCConnectionRelease substituted for RRCRelease, etc.)

Certain aspects of the present disclosure and their embodiments may provide solutions to these or other challenges. For example, according to certain embodiments, wireless device and network methods are proposed to handle early measurements during suspend/resume and release/setup procedures. Various options are proposed for handling the previous measurement configurations and results.

According to certain embodiments, methods are provided so that the wireless device (i.e., UE) can be instructed to release or keep the idle/inactive measurement configurations upon transitioning from dormant state (IDLE, IDLE with suspended, INACTIVE) state to connected state. The UE can also be provided with new/updated idle/inactive measurement configurations (i.e. full config or delta config) upon transitioning from dormant state to connected state. While in connected state, the UE stores the idle/inactive measurement configurations, but it refrains from performing measurements according to these configurations.

According to certain embodiments, methods are also provided to instruct the UE to release or keep the stored idle/inactive measurement configurations upon transitioning from a connected state to a dormant state. The UE can also be provided with new/updated idle/inactive (i.e. full config or delta config) upon transitioning from connected state to dormant state. The UE will store the updated idle/inactive configurations, if any, and performs measurements according to these configurations while in dormant state.

According to certain embodiments, a method is provided at a wireless device, which may also be called a wireless terminal or User Equipment (UE). The method includes:

Upon entering RRC CONNECTED (e.g. upon the reception of an RRC Resume or RRC Setup like message from the network, in response to an RRC Resume Request like message or an RRC Request like message):

the UE stores the current idle/inactive measurement configuration for early measurement reporting, if any;

the UE suspends performing any early measurements related to that stored configuration;

Upon entering RRC INACTIVE, or any other dormant state optimized for power savings (e.g. upon the reception of an RRC Release message):

the UE restores any possibly stored idle/inactive measurement configuration;
Depending on further idle/inactive early measurements configuration provided in that RRC Release message performing different actions on that configurations such as:
Release/remove at least part of the stored configuration;
Release/remove all of the stored configuration;
Replace certain parameters with new parameters;
Add certain new parameters;
Resume the operation related to early measurements according to outcome of the early measurement configuration after the UE restored any possibly stored early measurement configuration and after applying further early measurement configuration provided in the message moving the UE to Inactive state (or idle state, e.g., if RRCRelease like message does not contain a suspendConfig).

Regarding the previous steps on configuring the early measurement configuration, the method comprises the following:

Enhancements to RRCRelease:
An indication can be included in the RRCRelease to indicate if the UE should store the idle measurement configuration or not
In one variant, not having such an indication can be interpreted by the UE as an indication to release the stored configuration
In another variant, not having such an indication can be interpreted by the UE as an indication to keep the stored configuration.
The RRCRelease message is enhanced to include a full config flag. If the flag is included, the UE releases the previous idle measurement configurations, if any, and applies the new idle measurement configuration, if included.
If no full config flag is provided, the UE applies delta configurations on previous idle measurement configuration, if any.
Instead of the full config flag, the RRC release message can include a release flag that instructs the UE to release any stored idle/inactive mode measurement configuration. Optionally, an idle/inactive measurement configuration can be provided, and the result of this will be the same as the full config flag (i.e. release old config and add new one).

Enhancements to RRCReject:
An indication can be included in the RRCReject to indicate if the UE should store the idle measurement configuration or not
In one variant, not having such an indication can be interpreted by the UE as an indication to release the stored configuration
In another variant, not having such an indication can be interpreted by the UE as an indication to keep the stored configuration.
The RRCReject message is enhanced to include a full config flag. If the flag is included, the UE releases the previous idle measurement configuration, if any, and applies the new idle measurement configurations, if included.
If no full config flag is provided, the UE applies delta configurations on previous idle measurement configuration, if any.
Instead of the full config flag, the RRC Reject message can include a release flag that instructs the UE to release any stored idle/inactive mode measurement configuration. Optionally, an idle/inactive measurement configuration can be provided, and the result of this will be the same as the full config flag (i.e. release old config and add new one).

Enhancements to RRCResume:
An indication can be included in the RRCResume to indicate if the UE should store the idle measurement configuration or not
In one variant, not having such an indication can be interpreted by the UE as an indication to release the stored configuration
In another variant, not having such an indication can be interpreted by the UE as an indication to keep the stored configuration.
The RRCResume is enhanced to include an idle/inactive measurement configuration
If the full config flag is included in the resume message, the included idle/inactive measurement will replace the stored configuration
If the full config flag is not included in the resume message, the included idle/inactive measurement will replace the stored configuration
Instead of the full config flag that is part of the rel-15 RRC Resume message, a new flag (E.g. fullConfigEarlyMeas) can be introduced that applies only to the idle/inactive measurement configuration but not the other part of the resume configuration Enhancements to RRCReconfiguration:
An indication can be included in the RRCReconfiguration to indicate if the UE should store the idle measurement configuration or not
In one variant, not having such an indication can be interpreted by the UE as an indication to release the stored configuration
In another variant, not having such an indication can be interpreted by the UE as an indication to keep the stored configuration.
The RRCReconfiguration is enhanced to include an idle/inactive measurement configuration
If the full config flag is included in the reconfiguration message, the included idle/inactive measurement will replace the stored configuration
If the full config flag is not included in the reconfiguration message, the included idle/inactive measurement will replace the stored configuration
Instead of the full config flag that is part of the rel-15 RRC Reconfiguration message, a new flag (E.g. fullConfigEarlyMeas) can be introduced that applies only to the idle/inactive measurement configuration but not the other parts of the reconfiguration message One way to implement the method in the specifications is by defining a UE variable to store the configuration, e.g. VarMeasIdleInactiveConfig so that in the specifications a stored configuration may be used by another procedure. In some of the solutions described above, the UE stores the idle/inactive measurement configurations for early reporting upon entering RRC_CONNECTED (e.g. upon the reception of an RRC Resume like message or an RRC Setup like message). Then, when network decides to suspend or release the UE (e.g. by sending an RRC Release like message), the UE restores the configuration in the variable and applies any available inactive/idle measurement configuration for early reporting. Possibly based on specific fields or need codes in the idle measurement configuration, the UE is indicated to either apply the restored configuration, delete the restored configuration (i.e. not performing idle measurements upon entering in idled/inactive that time) or apply delta signaling on top of the restored configuration. Notice that need codes may also indicate whether the UE restores or deletes the configuration upon entering INACTIVE or IDLE state.

According to a particular embodiment, this UE variable could be defined as follows:
VarMeasIdleInactiveConfig
The UE variable VarMeasIdleInactiveConfig includes the configuration of the measurements to be performed by the UE while in RRC_IDLE or RRC_INACTIVE for NR and/or E-UTRA inter-frequency measurements. The UE performs logging of these measurements only while in RRC_IDLE or RRC_INACTIVE.

| VarMeasIdleInactiveConfig UE variable |
|---|
| -- ASN1START |
| -- TAG-VAR-MEAS-IDLE-INACTIVE-CONFIG-START |
| VarMeasIdleInactiveConfig-r16 ::= SEQUENCE { |
|     measIdleInactiveCarrierListNR-r16      NR-CarrierList-r16 OPTIONAL, Need N |
|     measIdleInactiveCarrierListEUTRA-r16  EUTRA-CarrierList-r16 OPTIONAL, Need N |
|     measIdleInactiveDuration-r16          ENUMERATED {sec10, sec30, sec60, sec120, |
|                                                           sec180, sec240, sec300, spare}, |
| } |
| -- ASN1STOP |
| -- TAG-VAR-MEAS-IDLE-INACTIVE-CONFIG-START |

For that solution, the specification could be modified as shown below. Notice that other variants also presented (e.g. based on full config or other flags), similar parts of the specifications would be changed. First, we change the RRC Resume procedure where the UE entering RRC_CONNECTED from INACTIVE needs to store the idle/inactive measurement configuration for early measurement reporting. We use the UE variable define above in this example, but the point is the action of storing the idle/inactive measurement configuration upon entering connected, as shown below. In a different flavor of that solution the idle/inactive measurement configuration is stored as part of the UE AS Inactive context. Hence, upon entering RRC_CONNECTED (when receiving RRCResume like message) the UE deletes the UE Inactive context except the idle/inactive measurement configuration. For example, Section 5.3.13.4 of the 3GPP TS 36.331 may be revised as follows (with new text shown with underlining):

5.3.13.4 Reception of the RRCResume by the UE
The UE shall:
1>stop timer T319;
1>stop timer T380, if running;
1>store idle/inactive measurement configuration (i.e. store the variable VarMeasIdleInactiveConfig), if available;
1>if the RRCResume includes the fullConfig:
  2>perform the full configuration procedure as specified in 5.3.5.11;
1>else:
  2>restore the masterCellGroup and pdcp-Config from the UE Inactive AS context;
1>discard the UE Inactive AS context except the ran-NotificationAreaInfo;
1>if the RRCResume includes the masterCellGroup:
  2>perform the cell group configuration for the received masterCellGroup according to 5.3.5.5;
1>if the RRCResume includes the radioBearerConfig:
  2>perform the radio bearer configuration according to 5.3.5.6;
1>resume SRB2 and all DRBs;
1>if stored, discard the cell reselection priority information provided by the cellReselectionPriorities or inherited from another RAT;
1>stop timer T320, if running;
1>if the RRCResume message includes the measConfig:
  2>perform the measurement configuration procedure as specified in 5.5.2;
1>resume measurements if suspended;
1>if T390 is running:
  2>stop timer T390 for all access categories;
  2>perform the actions as specified in 5.3.14.4;
1>if T302 is running:
  2>stop timer T302;
  2>perform the actions as specified in 5.3.14.4;
1>enter RRC_CONNECTED;
1>indicate to upper layers that the suspended RRC connection has been resumed;
1>stop the cell re-selection procedure;
1>consider the current cell to be the PCell;
1>set the content of the of RRCResumeComplete message as follows:
  2>if the upper layer provides NAS PDU, set the dedicatedNAS-Message to include the information received from upper layers;
  2>if the upper layer provides a PLMN, set the selectedPLMN-Identity to PLMN selected by upper layers (TS 24.501 [23]) from the PLMN(s) included in the plmn-IdentityList in [system information block-1 (SIB1)];
  2>if the masterCellGroup contains the reportUplinkTxDirectCurrent:
    3>include the uplinkTxDirectCurrentList;
1>submit the RRCResumeComplete message to lower layers for transmission;
1>the procedure ends.

Section 5.3.3.4 of the 3GPP TS 36.331 may also be revised as follows (with new text shown with underlining):
5.3.3.4 Reception of the RRCSetup by the UE
The UE shall perform the following actions upon reception of the RRCSetup:
1>if the RRCSetup is received in response to an RRCReestablishmentRequest; or
1>if the RRCSetup is received in response to an RRCResumeRequest or RRCResumeRequest1:
  2>discard any stored UE Inactive AS context and suspendConfig;

2>discard any current AS security context including the K$_{RRCenc}$ key, the K$_{RRCint}$ key, the K$_{UPint}$ key and the K$_{UPenc}$ key;
2>release radio resources for all established RBs except SRB0, including release of the RLC entities, of the associated PDCP entities and of SDAP;
2>release the RRC configuration except for the default L1 parameter values, default MAC Cell Group configuration and CCCH configuration;
2>indicate to upper layers fallback of the RRC connection;
2>stop timer T380, if running;
1>store idle/inactive measurement configuration (i.e. store the variable VarMeasIdleInactiveConfig), if available;
1>perform the cell group configuration procedure in accordance with the received masterCellGroup and as specified in 5.3.5.5;
1>perform the radio bearer configuration procedure in accordance with the received radioBearerConfig and as specified in 5.3.5.6;
1>if stored, discard the cell reselection priority information provided by the cellReselectionPriorities or inherited from another RAT;
1>stop timer T300, T301 or T319 if running;
1>if T390 is running:
 2>stop timer T390 for all access categories;
 2>perform the actions as specified in 5.3.14.4;
1>if T302 is running:
 2>stop timer T302;
 2>perform the actions as specified in 5.3.14.4;
1>stop timer T320, if running;
1>if the RRCSetup is received in response to an RRCResumeRequest, RRCResumeRequest1 or RRCSetupRequest:
 2>enter RRC_CONNECTED;
 2>stop the cell re-selection procedure;
1>consider the current cell to be the PCell;
1>set the content of RRCSetupComplete message as follows:
 2>if upper layers provide a 5G-S-TMSI:
  3>if the RRCSetup is received in response to an RRCSetupRequest:
   4>set the ng-5G-S-TMSI-Value to ng-5G-S-TMSI-Part2;
  3>else:
   4>set the ng-5G-S-TMSI-Value to ng-5G-S-TMSI;
 2>set the selectedPLMN-Identity to the PLMN selected by upper layers (TS 24.501 [23]) from the PLMN(s) included in the plmn-IdentityList in SIB1;
 2>if upper layers provide the 'Registered AMF':
  3>include and set the registeredAMF as follows:
   4>if the PLMN identity of the 'Registered AMF' is different from the PLMN selected by the upper layers:
    5>include the plmnIdentity in the registeredAMF and set it to the value of the PLMN identity in the 'Registered AMF' received from upper layers;
   4>set the amf-Identifier to the value received from upper layers;
  3>include and set the guami-Type to the value provided by the upper layers;
 2>if upper layers provide one or more S-NSSAI (see TS 23.003 [21]):
  3>include the s-NSSAI-List and set the content to the values provided by the upper layers;
 2>set the dedicatedNAS-Message to include the information received from upper layers;
1>submit the RRCSetupComplete message to lower layers for transmission, upon which the procedure ends The step of storing the idle/inactive measurement configuration may also be realizing by stopping the timer controlling the requirements that the UE shall perform idle/inactive measurements, and, upon stopping the timer, perform the action of storing this idle/inactive measurement configuration e.g. in the UE variable described above.

Then, after the previous step an RRC_CONNECTED UE may have stored an Idle/Inactive measurement configuration. That configuration may be handed over with the UE, in case the UE is handed over to another cell. The source may provide that to the target candidate in the handover preparation phase and, upon accessing the target cell the UE still has that configuration stored.

According to certain other embodiments, the configuration may not be handed over with the UE, in case the UE is handed over to another cell. In other words, the UE may delete that idle/inactive measurement configuration upon the reception of a handover command (i.e. an RRCReconfiguration with a reconfiguration with sync).

According to certain embodiments, upon receiving an RRC Release like message indicating that the UE shall transition to INACTIVE or IDLE, the UE is indicated on how to handle a possibly stored idle/inactive measurement configuration. In a particular embodiment, the UE checks if the message contains an indication that the network wants the UE to perform idle/inactive measurements for early reporting or not. If that wish is indicated by the network (e.g. realized by the presence of a field for idle/inactive measurement configuration for early measurements), the UE restores the stored idle/inactive measurement configuration for early reporting, and applies the content of the message (i.e. add, releases or modify the restored configuration for early measurements). Section 5.3.8.3 of 3GPP TS 36.331 may discloses reception of the RRCRelease message by the UE.

For the case where the UE stores the idle/inactive measurement configuration when it enters RRC_CONNECTED, the method may also include, in certain embodiments, a mechanism to delete any stored idle/inactive measurement configuration when the network wants to suspend the UE to inactive or release the UE to idle, in addition to mechanisms to apply full configuration (i.e., delete/release stored configuration and apply a new configuration provided in RRC Release) or delta configuration (i.e. restored stored configuration and use it, and apply a new configuration provided in RRC Release in addition such as, for example, adding a new carrier, adding a beam measurement configuration, etc.).

There are different ways to realize this. According to certain embodiments, a solution is provided to rely on need codes defined in the RRC specifications. In that case, defining the main field for the idle/inactive measurement configuration as Need R means that its absence leads to the UE deleting any stored configuration that has been restored. Then, if that is present, the fields that are subject to delta signaling have need M so that its absence would mean that the UE relies on the restored configuration. Some other fields may be mandatory if the idle/inactive measurement configuration is provided e.g. the timer value for T331, according to certain embodiments.

Figure 8:
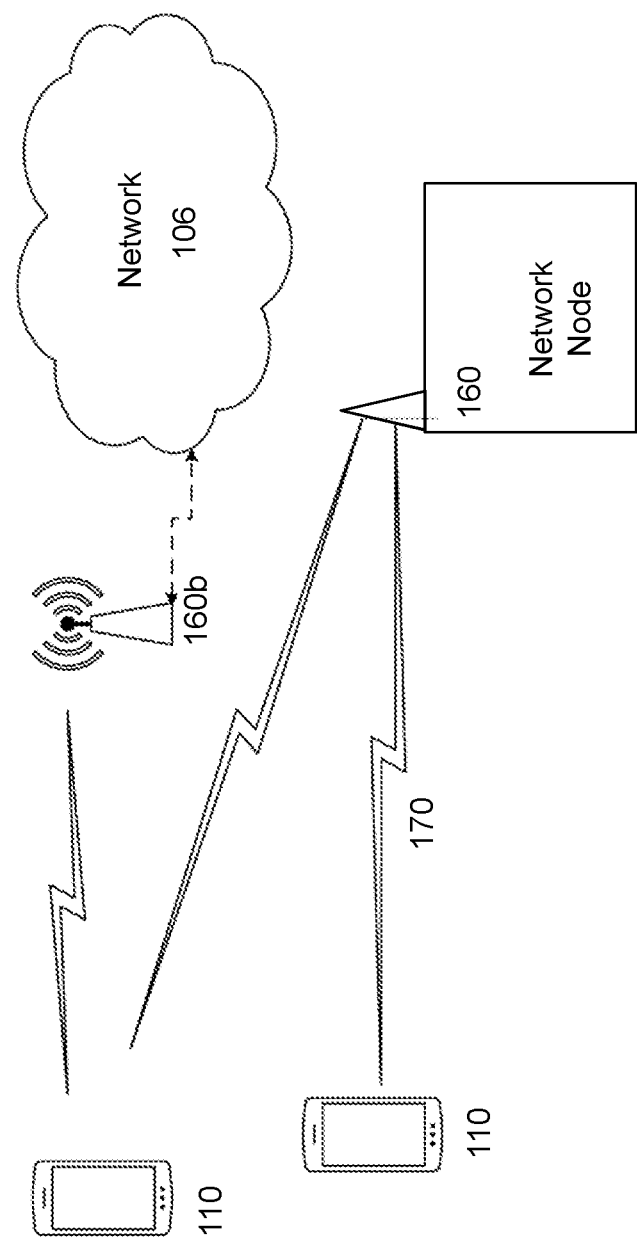
FIG. 8 illustrates an example wireless network, according to certain embodiments.

FIG. 8 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 106, network nodes 160 and 160b, and wireless devices (WDs) 110. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 9:
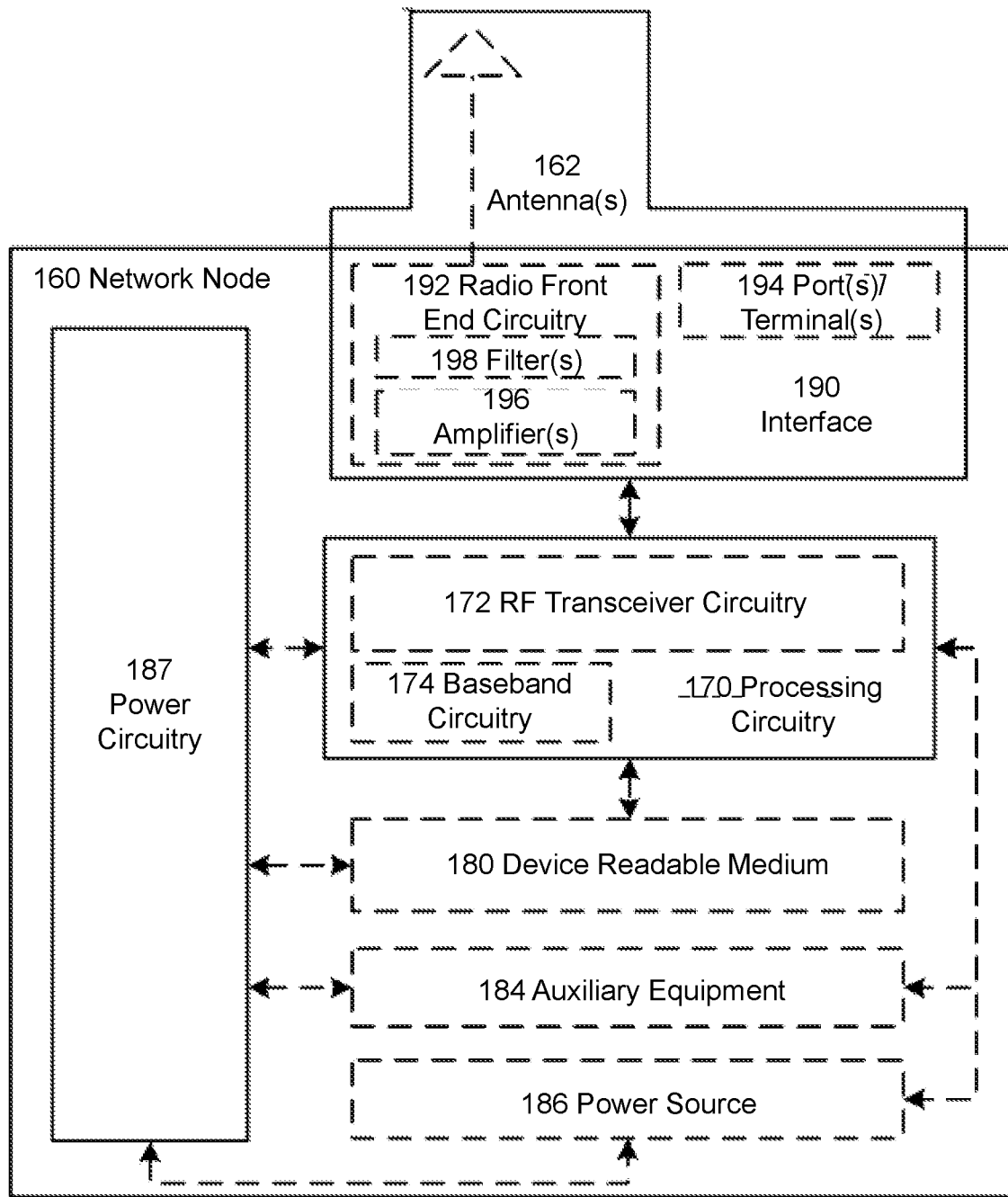
FIG. 9 illustrates an example network node, according to certain embodiments.

FIG. 9 illustrates a network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 160 includes processing circuitry 170, device readable medium 180, interface 190, auxiliary equipment 184, power source 186, power circuitry 187, and antenna 162. Although network node 160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 9 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 10:
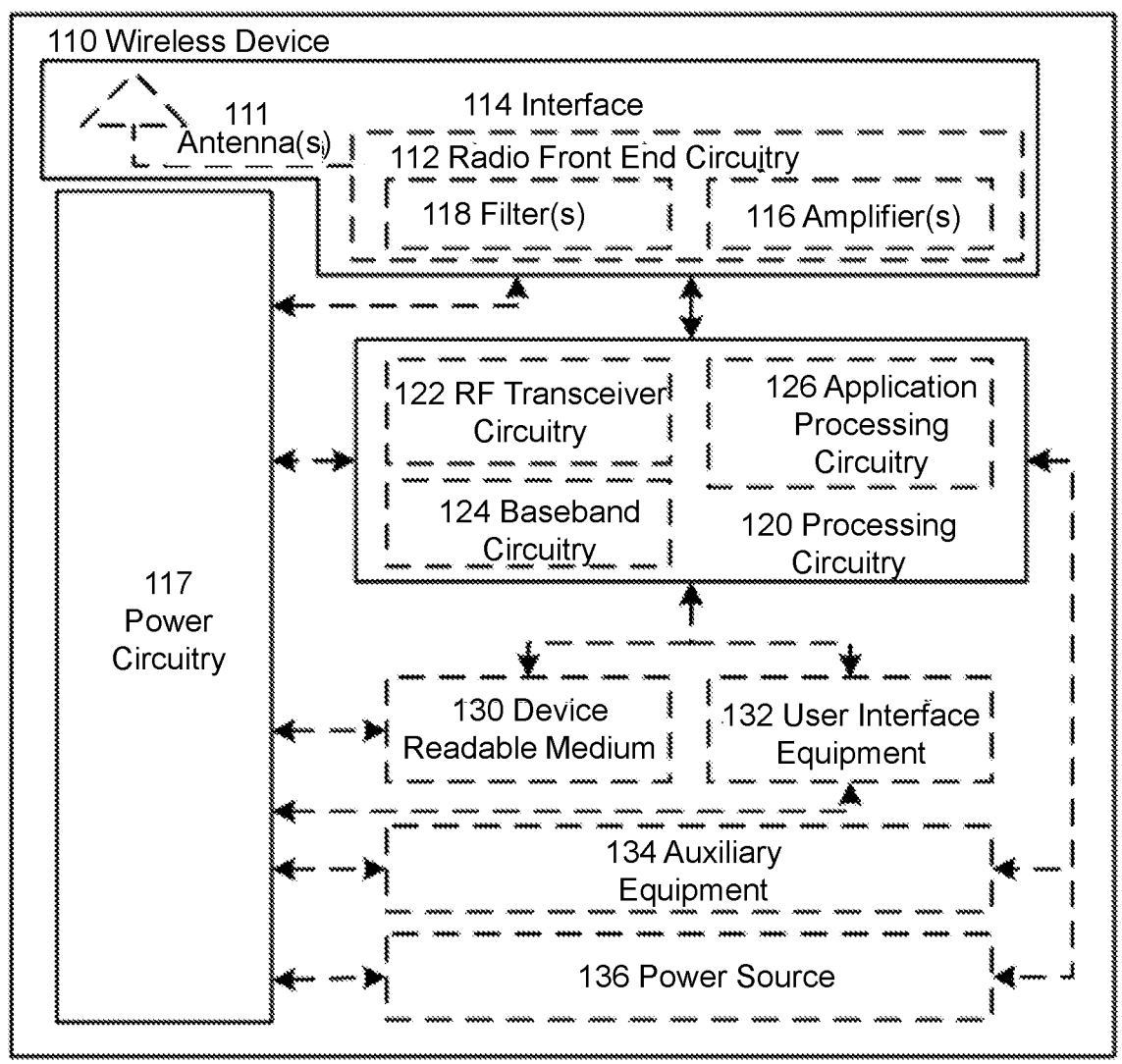
FIG. 10 illustrates an example wireless device, according to certain embodiments.

FIG. 10 illustrates an example WD 110, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 11:
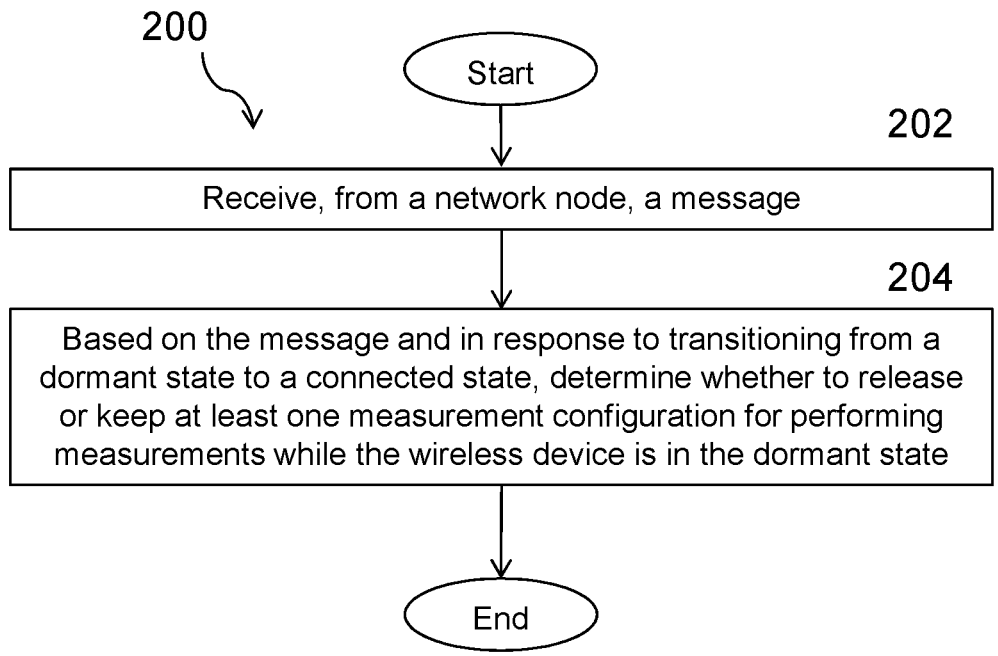
FIG. 11 illustrates an example method by a wireless device, according to certain embodiments.

FIG. 11 depicts a method 200 by a wireless device, according to certain embodiments. At step 202, the wireless device receives, from a network node, a message. Based on the message and in response to transitioning from the dormant state to a connected state, the wireless device determines whether to release or keep at least one measurement configuration for performing measurements while the wireless device is in a dormant state, at step 204.

In a particular embodiment, the message indicates that the wireless device is to release at least one measurement configuration, and the method further comprises, upon transitioning to the connected state, releasing by the wireless device the at least one measurement configuration based on the message.

In a particular embodiment, the message indicates that the wireless device is to continue storing the at least one measurement configuration, and upon transitioning to the connected state, the wireless device keeps the at least one measurement configuration based on the message.

In a particular embodiment, based on the message, the wireless device transmits at least one measurement performed during the dormant state to the network node after the transition to the connected state.

In a particular embodiment, the dormant state comprises an IDLE state, an IDLE with suspended state, or an INACTIVE state.

In a particular embodiment, the wireless device transitions from the connected state to the dormant state, and upon transitioning from the connected state to the dormant state, the wireless device determines whether to release or keep the at least one measurement configuration for performing measurements while the wireless device is in a dormant state.

In a particular embodiment, the wireless device determines whether to release or keep the at least one measurement configuration upon transitioning from the connected state to the dormant state based on the message.

In a particular embodiment, the wireless device receives a second message from the network node, and the second message comprises an updated measurement configuration for performing measurements while in the dormant state. Determining whether to release or keep the at least one measurement configuration upon transitioning from the connected state to the dormant state may be based on the second message.

In a particular embodiment, the wireless device stores an updated measurement configuration that was received in the second message.

In a particular embodiment, while in the dormant state, the wireless device performs at least one measurement based on the updated measurement configuration.

In a particular embodiment, it is determined to keep the at least one measurement configuration and the wireless device performs at least one measurement based on the at least one measurement configuration while in the dormant state.

Figure 12:
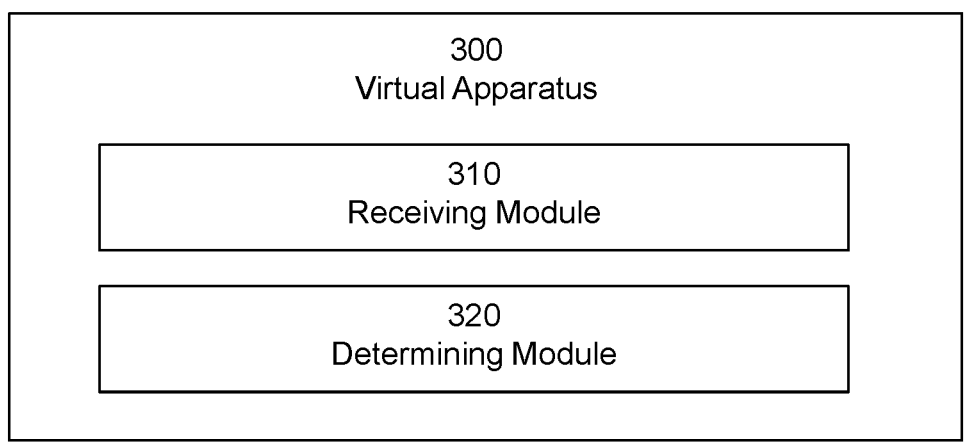
FIG. 12 illustrates an exemplary virtual computing device, according to certain embodiments.

FIG. 12 illustrates a schematic block diagram of a virtual apparatus 300 in a wireless network (for example, the wireless network shown in FIG. 8). The apparatus may be implemented in a wireless device or network node (e.g., wireless device 110 or network node 160 shown in FIG. 8). Apparatus 300 is operable to carry out the example method described with reference to FIG. 11 and possibly any other processes or methods disclosed herein. It is also to be understood that the method of FIG. 11 is not necessarily carried out solely by apparatus 300. At least some operations of the method can be performed by one or more other entities.

Virtual Apparatus 300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 310, determining module 320, and any other suitable units of apparatus 300 to perform corresponding functions according one or more embodiments of the present disclosure.

According to certain embodiments, receiving module 310 may perform certain of the receiving functions of the apparatus 300. For example, receiving module 310 may receive, from a network node, a message.

According to certain embodiments, determining module 320 may perform certain of the determining functions of the apparatus 300. For example, determining module 320 may determine whether to release or keep at least one measurement configuration for performing measurements while the wireless device is in a dormant state. The determination may be based on the message and in response to transitioning from the dormant state to a connected state.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 13:
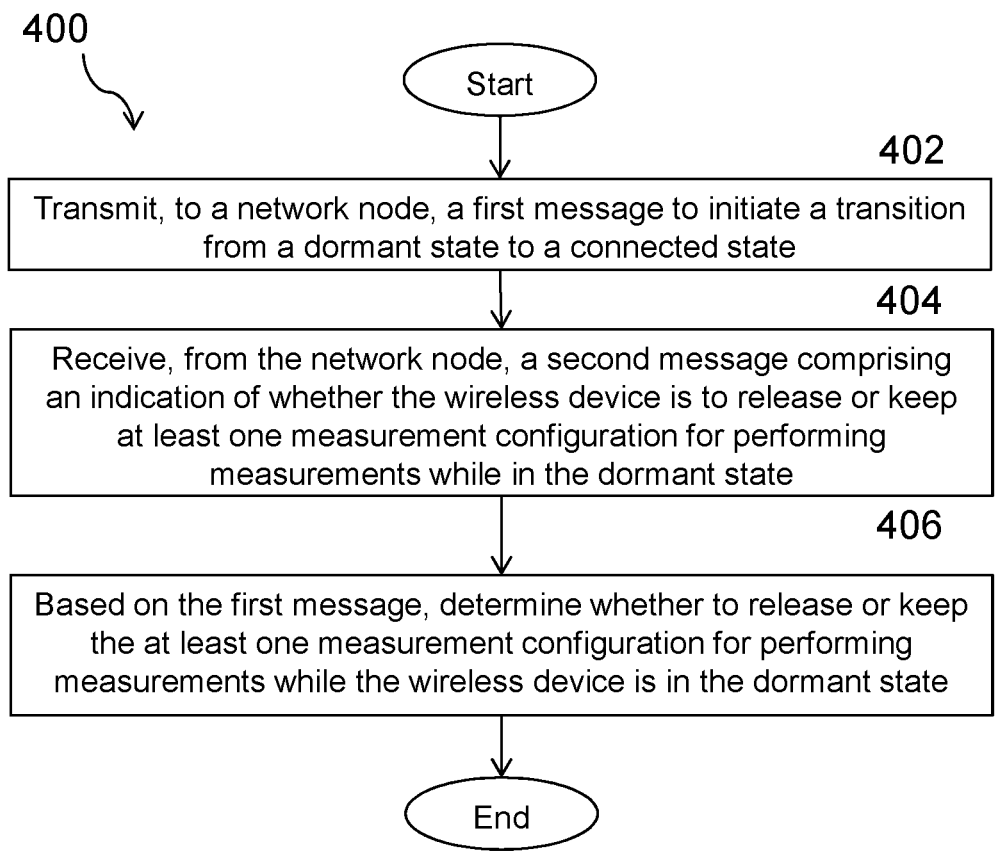
FIG. 13 illustrates another example method by a wireless device, according to certain embodiments.

FIG. 13 depicts another method 400 by a wireless device for measurement reporting, according to certain embodiments. At step 402, the wireless device 110 transmits, to a network node 160, a first message to initiate a transition from a dormant state to a connected state. At step 404, the wireless device 110 receives, from the network node 160, a second message including an indication of whether the wireless device is to release or keep at least one measurement configuration for performing measurements while in the dormant state. Based on the first message, the wireless device 110 determines whether to release or keep the at least one measurement configuration for performing measurements while the wireless device is in the dormant state, at step 406.

In a particular embodiment, the second message comprises a RRC Release message.

In a particular embodiment, the second message indicates that the wireless device 110 is to release the at least one measurement configuration, and the method further includes the wireless device 110 releasing the at least one measurement configuration based on the first message.

In a particular embodiment, the second message indicates that the wireless device 110 is to continue storing the at least one measurement configuration, and the method further includes the wireless device 110 keeping the at least one measurement configuration based on the first message.

In a particular embodiment, the dormant state comprises an IDLE state, an IDLE with suspended state, or an INACTIVE state.

In a particular embodiment, the wireless device 110 receives a third message from the network node 160. Third message includes an updated measurement configuration for performing measurements while in the dormant state, and the wireless device 110 stores the updated measurement configuration for performing measurements while in the dormant state.

In a particular embodiment, while in the dormant state, the wireless device 110 performs at least one measurement based on the updated measurement configuration.

Figure 14:
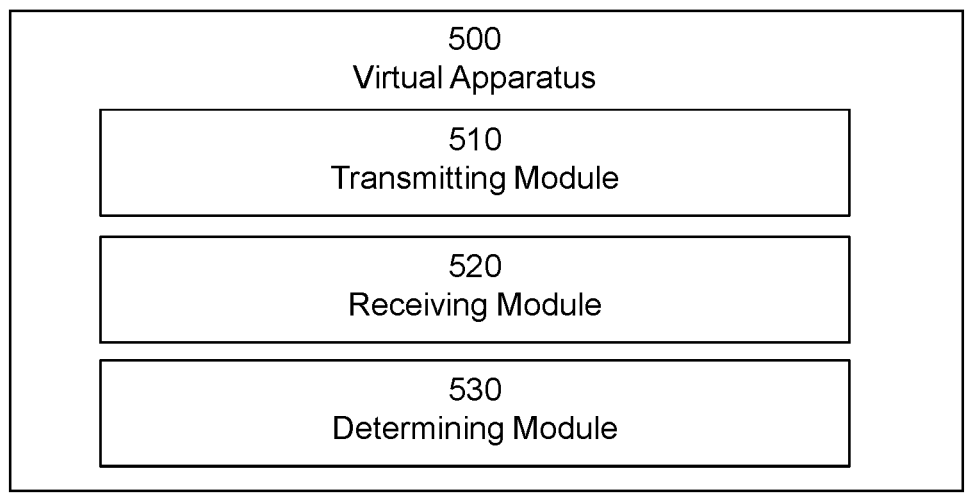
FIG. 14 illustrates another exemplary virtual computing device, according to certain embodiments.

FIG. 14 illustrates a schematic block diagram of a virtual apparatus 500 in a wireless network (for example, the wireless network shown in FIG. 8). The apparatus may be implemented in a wireless device or network node (e.g., wireless device 110 or network node 160 shown in FIG. 8). Apparatus 500 is operable to carry out the example method described with reference to FIG. 13 and possibly any other processes or methods disclosed herein. It is also to be understood that the method of FIG. 13 is not necessarily carried out solely by apparatus 500. At least some operations of the method can be performed by one or more other entities.

Virtual Apparatus 500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 510, receiving module 520, determining module 530, and any other suitable units of apparatus 500 to perform corresponding functions according one or more embodiments of the present disclosure.

According to certain embodiments, transmitting module 510 may perform certain of the transmitting functions of the apparatus 500. For example, transmitting module 510 may transmit, to a network node 160, a first message to initiate a transition from a dormant state to a connected state.

According to certain embodiments, receiving module 520 may perform certain of the receiving functions of the apparatus 500. For example, receiving module 520 may receive, from the network node 160, a second message including an indication of whether the wireless device is to release or keep at least one measurement configuration for performing measurements while in the dormant state.

According to certain embodiments, determining module 530 may perform certain of the determining functions of the apparatus 500. For example, based on the first message, determining module 530 may determine whether to release or keep the at least one measurement configuration for performing measurements while the wireless device is in the dormant state.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 15:
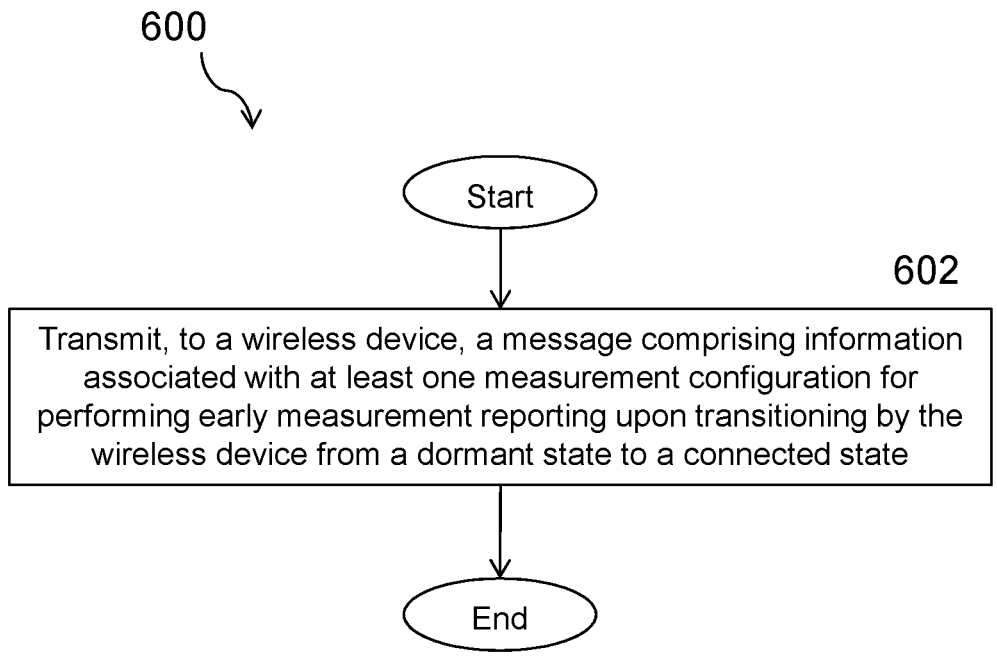
FIG. 15 illustrates an example method by a network node, according to certain embodiments.

FIG. 15 depicts a method 600 by a network node 160, according to certain embodiments. At step 602, the network node transmits, to a wireless device, a message comprising information associated with at least one measurement configuration for performing early measurement reporting upon transitioning by the wireless device from a dormant state to a connected state.

In a particular embodiment, the message includes an RRC Resume or RRC setup message.

In a particular embodiment, the message includes a RRC-ConnectionResume message.

In a particular embodiment, the message includes an indication for determining by the wireless device whether to store the at least one measurement configuration for early measurement reporting.

In a particular embodiment, the indication indicates that the wireless device should store the at least one measurement configuration for early measurement reporting.

In a particular embodiment, the indication indicates that the wireless device should not store the at least one measurement configuration for early measurement reporting.

In a particular embodiment, the indication comprises an early measurement configuration to replace at least a portion of the at least one measurement configuration for early measurement reporting.

In a particular embodiment, the indication comprises a new early measurement configuration to replace all of the at least one measurement configuration for early measurement reporting with the new early measurement configuration.

In a particular embodiment, the message does not include an indication relating to early measurement reporting, and the network node configures the wireless device to determine, based on the lack of an indication, to store the at least one measurement configuration.

In a particular embodiment, the message does not include an indication relating to early measurement reporting, and the network node configures the wireless device to determining, based on the lack of an indication, to release the at least one measurement configuration.

In a particular embodiment, the network node transmits, a second message to the wireless device, for determining whether to store the at least one measurement configuration upon transitioning from the connected state to the dormant state. In a particular embodiment, the second message comprises a RRC Release message. In a particular embodiment, the second message comprises an indication. In a further particular embodiment, the indication indicates that the wireless device should store the at least one measurement configuration for early measurement reporting. In another embodiment, the indication indicates that the wireless device should not store the at least one measurement configuration for early measurement reporting. In still another embodiment, the indication comprises an early measurement configuration and the method further comprises configuring the wireless device to replace at least a portion of the at least one measurement configuration for early measurement reporting. In still another embodiment, the indication comprises a new early measurement configuration and the network node configures the wireless device to replace all of the at least one measurement configuration for early measurement reporting with the new early measurement configuration.

In another particular embodiment, the second message does not include an indication relating to early measurement reporting, and the network node configures the wireless device to determine, based on the lack of an indication, to store the at least one measurement configuration.

In yet another particular embodiment, the second message does not include an indication relating to early measurement reporting, and the network node configures the wireless device to determining, based on the lack of an indication, to release the at least one measurement configuration.

In a particular embodiment, the dormant state comprises an IDLE state, an IDLE with suspended state, or an INACTIVE state.

Figure 16:
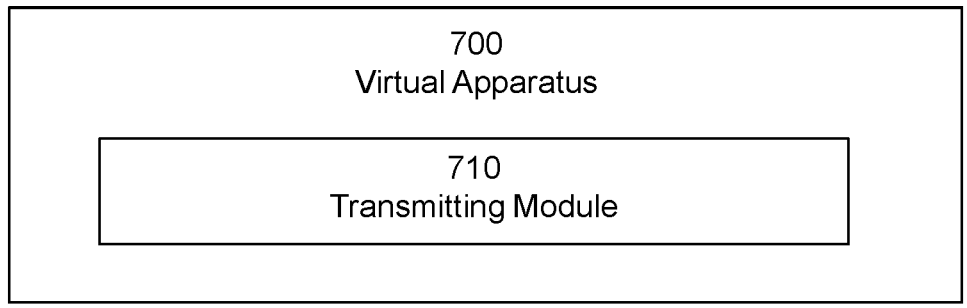
FIG. 16 illustrates another exemplary virtual computing device, according to certain embodiments.

FIG. 16 illustrates a schematic block diagram of a virtual apparatus 700 in a wireless network (for example, the wireless network shown in FIG. 8). The apparatus may be implemented in a wireless device or network node (e.g., wireless device 110 or network node 160 shown in FIG. 8). Apparatus 700 is operable to carry out the example method described with reference to FIG. 15 and possibly any other processes or methods disclosed herein. It is also to be understood that the method of FIG. 15 is not necessarily carried out solely by apparatus 700. At least some operations of the method can be performed by one or more other entities.

Virtual Apparatus 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 710 and any other suitable units of apparatus 700 to perform corresponding functions according one or more embodiments of the present disclosure.

According to certain embodiments, transmitting module 710 may perform certain of the transmitting functions of the apparatus 700. For example, transmitting module 710 may transmit, to a wireless device, a message comprising information associated with at least one measurement configuration for performing early measurement reporting upon transitioning by the wireless device from a dormant state to a connected state.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 17:
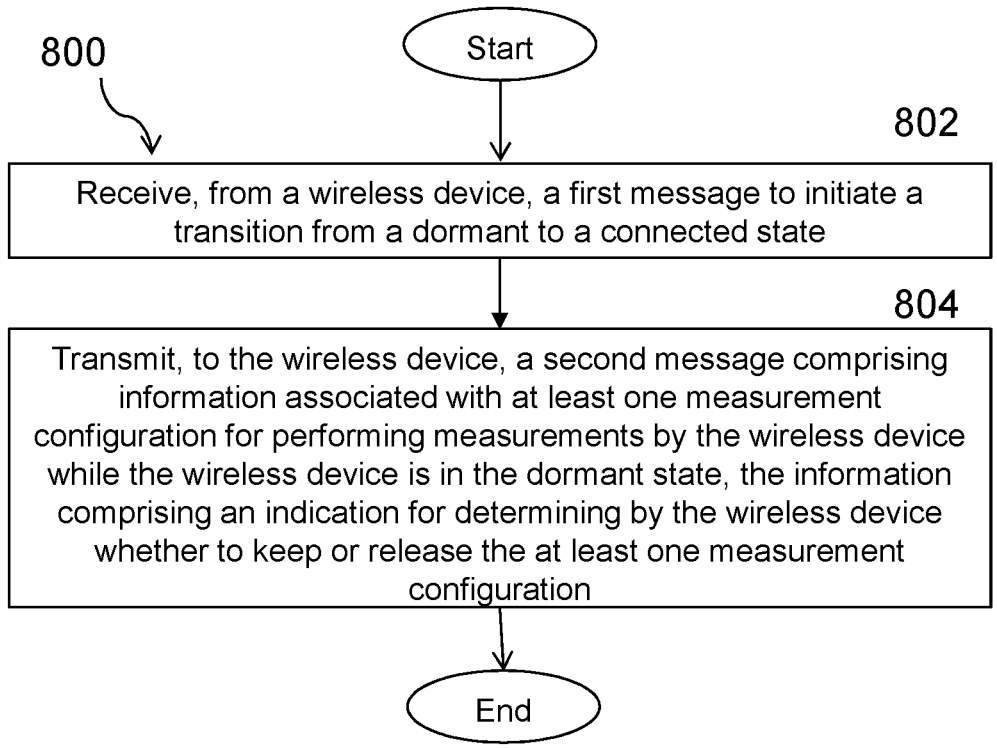
FIG. 17 illustrates another example method by a network node, according to certain embodiments.

FIG. 17 depicts a method 800 by a network node 160, according to certain embodiments. At step 802, the network node 160 receives, from a wireless device 110, a first message to initiate a transition from a dormant state to a connected state. At step 804, the network node 160 transmits, to the wireless device 110, a second message comprising information associated with at least one measurement configuration for performing measurements by the wireless device 110 while the wireless device is in the dormant state. The information includes an indication for determining by the wireless device 110 whether to keep or release the at least one measurement configuration.

In a particular embodiment, the second message comprises an RRC Release message.

In a particular embodiment, the indication indicates that the wireless device 110 is to store the at least one measurement configuration.

In a particular embodiment, the indication indicates that the wireless device 110 is to release the at least one measurement configuration.

In a particular embodiment, the at least one measurement configuration comprises an early measurement reporting configuration and the method further includes configuring, by the network node 160, the wireless device 110 to replace at least a portion of the at least one measurement configuration based on the second message.

In a particular embodiment, the indication comprises a new early measurement reporting configuration and the method further includes configuring, by the network node 160, the wireless device 110 to replace all of the at least one measurement configuration with the new early measurement reporting configuration.

In a particular embodiment, the dormant state comprises an IDLE state, an IDLE with suspended state, or an INACTIVE state.

In a particular embodiment, the network node 160 transmits a third message to the wireless device 110. The third message includes an updated measurement configuration for performing measurements by the wireless device 110 while the wireless device is in the dormant state.

Figure 18:
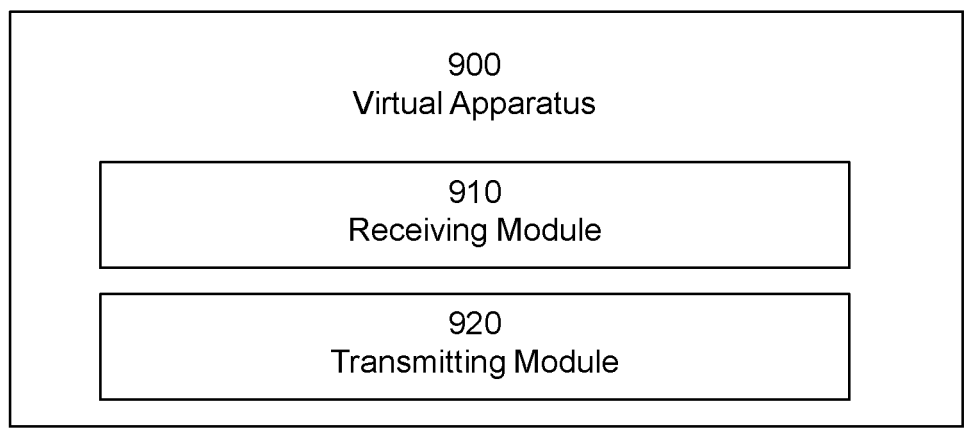
FIG. 18 illustrates another exemplary virtual computing device, according to certain embodiments.

FIG. 18 illustrates a schematic block diagram of a virtual apparatus 900 in a wireless network (for example, the wireless network shown in FIG. 8). The apparatus may be implemented in a wireless device or network node (e.g., wireless device 110 or network node 160 shown in FIG. 8). Apparatus 900 is operable to carry out the example method described with reference to FIG. 17 and possibly any other processes or methods disclosed herein. It is also to be understood that the method of FIG. 17 is not necessarily carried out solely by apparatus 900. At least some operations of the method can be performed by one or more other entities.

Virtual Apparatus 900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc.

Program code stored in memory includes program instructions for executing one or more telecommunications and/or data communications protocols as well as instructions for carrying out one or more of the techniques described herein, in several embodiments. In some implementations, the processing circuitry may be used to cause receiving module 910, transmitting module 920 and any other suitable units of apparatus 900 to perform corresponding functions according one or more embodiments of the present disclosure.

According to certain embodiments, receiving module 910 may perform certain of the receiving functions of the apparatus 900. For example, receiving module 910 may receive, from a wireless device 110, a first message to initiate a transition from a dormant state to a connected state.

According to certain embodiments, transmitting module 920 may perform certain of the transmitting functions of the apparatus 900. For example, transmitting module 920 may transmit, to the wireless device, a second message comprising information associated with at least one measurement configuration for performing measurements by the wireless device 110 while the wireless device is in the dormant state. The information includes an indication for determining by the wireless device 110 whether to keep or release the at least one measurement configuration.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 19:
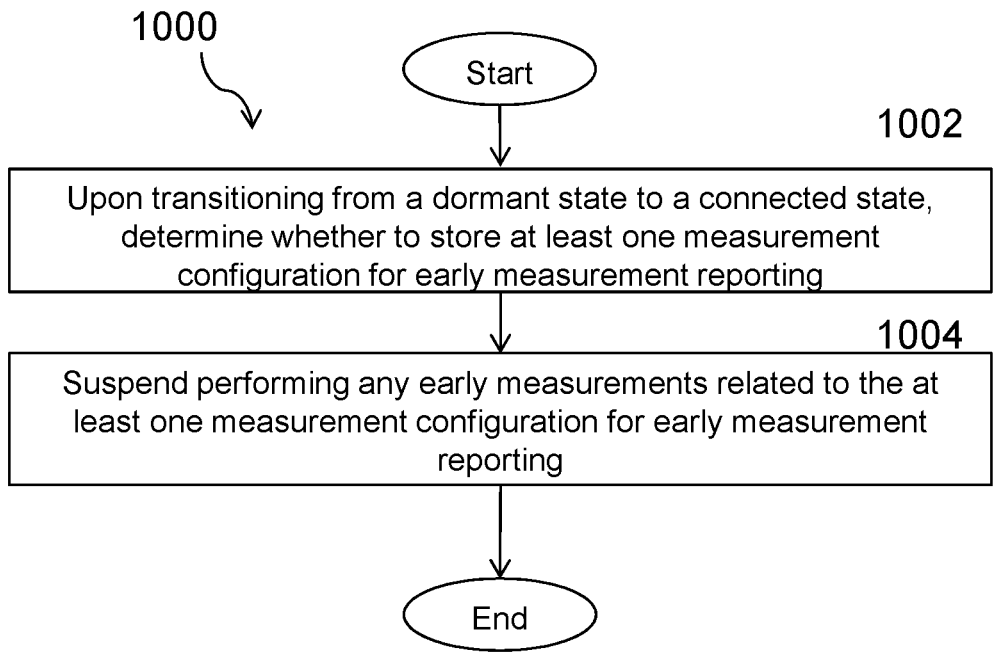
FIG. 19 illustrates another example method by a wireless device, according to certain embodiments.

FIG. 19 depicts another method 1000 by a wireless device 110, according to certain embodiments. At step 1002, upon transitioning from a dormant state to a connected state, the wireless device determines whether to store at least one measurement configuration for early measurement reporting. At step 1004, wireless device suspends performing any early measurements related to the at least one measurement configuration for early measurement reporting.

In a particular embodiment, the wireless device receives a message from a network node and determines whether to store the at least one measurement configuration based on the message.

In a particular embodiment, the message is an RRC Resume or RRC setup message.

In a particular embodiment, the message is a RRCConnectionResume message.

In a particular embodiment, the message includes an indication. In a further particular embodiment, the indication indicates that the wireless device should store the at least one measurement configuration for early measurement reporting. In a further particular embodiment, the indication indicates that the wireless device should not store the at least one measurement configuration for early measurement reporting. In still another embodiment, the indication comprises an early measurement configuration and the wireless device replaces at least a portion of the at least one measurement configuration for early measurement reporting. In yet another embodiment, the indication includes a new early measurement configuration and the wireless device replaces all of the at least one measurement configuration for early measurement reporting with the new early measurement configuration.

In a particular embodiment, the message does not including an indication relating to early measurement reporting, and the wireless device determines, based on the lack of an indication, to store the at least one measurement configuration.

In a particular embodiment, the message does not include an indication relating to early measurement reporting, and the wireless device determines, based on the lack of an indication, to release the at least one measurement configuration.

In a particular embodiment, the wireless device transitions from the connected state to the dormant state and determines whether to store the at least one measurement configuration upon transitioning from the connected state to the dormant state.

In a particular embodiment, the wireless device receives a message from a network node and determines whether to store the at least one measurement configuration upon transitioning from the connected state to the dormant state in response to the message.

In a particular embodiment, the message comprises a RRC Release message.

In a particular embodiment, the message comprises an indication. In a further particular embodiment, the indication indicates that the wireless device should store the at least one measurement configuration for early measurement reporting. In still another particular embodiment, the indication indicates that the wireless device should not store the at least one measurement configuration for early measurement reporting. In still another particular embodiment, the indication includes an early measurement configuration and the wireless device replaces at least a portion of the at least one measurement configuration for early measurement reporting.

In a particular embodiment, the indication comprises a new early measurement configuration and the method further comprises replacing all of the at least one measurement configuration for early measurement reporting with the new early measurement configuration.

In a particular embodiment, the message does not include an indication relating to early measurement reporting, and the wireless device determines, based on the lack of an indication, to store the at least one measurement configuration.

In a particular embodiment, the message does not include an indication relating to early measurement reporting, and the wireless device determines, based on the lack of an indication, to release the at least one measurement configuration.

In a particular embodiment, the dormant state comprises an IDLE state, an IDLE with suspended state, or an INACTIVE state.

Figure 20:
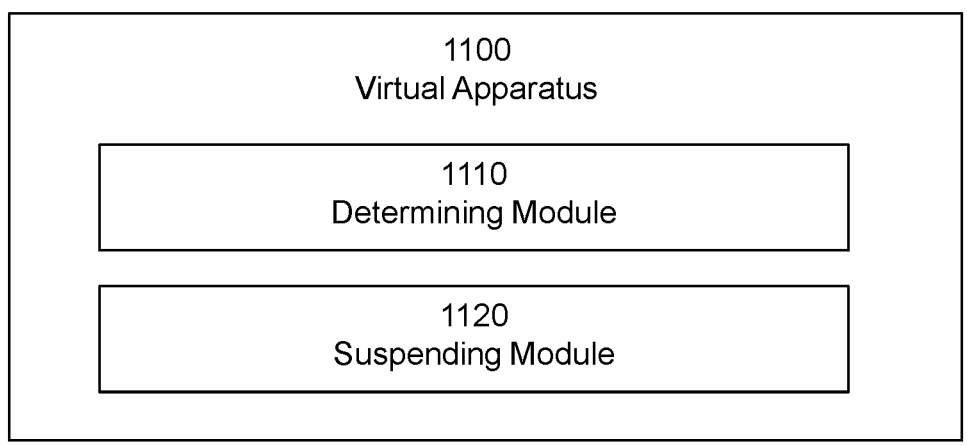
FIG. 20 illustrates another exemplary virtual computing device, according to certain embodiments.

FIG. 20 illustrates a schematic block diagram of a virtual apparatus 1100 in a wireless network (for example, the wireless network shown in FIG. 8). The apparatus may be implemented in a wireless device or network node (e.g., wireless device 110 or network node 160 shown in FIG. 8). Apparatus 1100 is operable to carry out the example method described with reference to FIG. 19 and possibly any other processes or methods disclosed herein. It is also to be understood that the method of FIG. 19 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1110, suspending module 1120, and any other suitable units of apparatus 1100 to perform corresponding functions according one or more embodiments of the present disclosure.

According to certain embodiments, determining module 1110 may perform certain of the determining functions of the apparatus 1100. For example, upon transitioning from a dormant state to a connected state, determining module 1110 may determine whether to store at least one measurement configuration for early measurement reporting.

According to certain embodiments, suspending module 1120 may perform certain of the suspending functions of the apparatus 1100. For example, suspending module 1120 may suspend performing any early measurements related to the at least one measurement configuration for early measurement reporting.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a wireless device for measurement reporting, the method comprising:
   receiving, from a network node, a message comprising an indication of whether the wireless device is to release or keep at least one measurement configuration for performing measurements while in a dormant state;
   based on the message and in response to transitioning from the dormant state to a connected state, determining whether to release or keep the at least one measurement configuration for performing measurements while the wireless device is in the dormant state; and
   receiving an another message from the network node, wherein the another message comprises an updated measurement configuration for performing measurements while the wireless device is in the dormant state.

2. The method of claim 1, wherein the message comprises a Radio Resource Control (RRC) Release message.

3. The method of claim 1, wherein the message indicates that the wireless device is to release the at least one measurement configuration, and the method further comprises releasing the at least one measurement configuration based on the message.

4. The method of claim 1, wherein the message indicates that the wireless device is to continue storing the at least one measurement configuration, and the method further comprises keeping the at least one measurement configuration based on the message.

5. A wireless device comprising:
   processing circuitry operable to:
   receive, from a network node, a message comprising an indication of whether the wireless device is to release or keep at least one measurement configuration for performing measurements while in a dormant state;
   based on the message and in response to transitioning from the dormant state to a connected state, determine whether to release or keep the at least one measurement configuration for performing measurements while the wireless device is in the dormant state; and
   receive an another message from the network node, wherein the another message comprises an updated measurement configuration for performing measurements while the wireless device is in the dormant state.

6. The wireless device of claim 5, wherein the message comprises a Radio Resource Control (RRC) Release message.

7. The wireless device of claim 5, wherein the message indicates that the wireless device is to release the at least one measurement configuration, and the processing circuitry is configured to release the at least one measurement configuration based on the message.

8. The wireless device of claim 5, wherein the message indicates that the wireless device is to continue storing the at least one measurement configuration, and processing circuitry is configured to keep the at least one measurement configuration based on the message.

9. The wireless device of claim 5, wherein the dormant state comprises an IDLE state, an IDLE with suspended state, or an INACTIVE state.

10. The wireless device of claim 5, wherein the processing circuitry is further configured to:
    store the updated measurement configuration for performing measurements while in the dormant state that was received in the another message.

11. The wireless device of claim 5, wherein the processing circuitry is configured to:
    while in the dormant state, perform at least one measurement based on the updated measurement configuration.

12. A method performed by a network node, the method comprising:
    transmitting, to a wireless device, a message comprising information associated with at least one measurement configuration for performing measurements reporting upon transitioning by the wireless device from a dormant state to a connected state, the information comprising an indication for determining by the wireless device whether to keep or release the at least one measurement configuration for early measurement reporting, and transmitting an another message to the wireless device, the another message comprising an updated measurement configuration for performing measurements by the wireless device while the wireless device is in the dormant state.

13. A network node comprising:

processing circuitry configured to:

transmit, to the wireless device, a message comprising information associated with at least one measurement configuration for performing measurements reporting upon transitioning by the wireless device from a dormant state to a connected state, the information comprising an indication for determining by the wireless device whether to keep or release the at least one measurement configuration for early measurement reporting, and transmit an another message to the wireless device, the another message comprising an updated measurement configuration for performing measurements by the wireless device while the wireless device is in the dormant state.

14. The network node of claim 13, wherein the message comprises a Radio Resource Control (RRC) Release message.

15. The network node of claim 13, wherein the indication indicates that the wireless device is to store the at least one measurement configuration.

16. The network node of claim 13, wherein the indication indicates that the wireless device is to release the at least one measurement configuration.

17. The network node of claim 13, wherein the at least one measurement configuration comprises a measurement reporting configuration and the processing circuitry is configured to configure the wireless device to replace at least a portion of the at least one measurement configuration based on the message.

18. The network node of claim 13, wherein the indication comprises a new measurement reporting configuration and the processing circuitry is configured to configure the wireless device to replace all of the at least one measurement configuration with the new measurement reporting configuration.

19. The network node of claim 13, wherein the dormant state comprises an IDLE state, an IDLE with suspended state, or an INACTIVE state.

* * * * *